US012768700B2

(12) United States Patent
Kanoda et al.

(10) Patent No.: US 12,768,700 B2
(45) Date of Patent: Oct. 20, 2026

(54) LEVEL METER

(71) Applicant: Keyence Corporation, Osaka (JP)

(72) Inventors: Sohei Kanoda, Osaka (JP); Kazuaki Nakamura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 285 days.

(21) Appl. No.: 18/605,909

(22) Filed: Mar. 15, 2024

(65) Prior Publication Data

US 2024/0361170 A1 Oct. 31, 2024

(30) Foreign Application Priority Data

Apr. 26, 2023 (JP) ................................ 2023-072442

(51) Int. Cl.
*G01F 23/284* (2006.01)

(52) U.S. Cl.
CPC .................................. *G01F 23/284* (2013.01)

(58) Field of Classification Search
CPC .................................................... G01F 23/284
See application file for complete search history.

(56) References Cited

U.S. PATENT DOCUMENTS

2022/0082426 A1* 3/2022 Wälde ..................... G01S 7/032
2025/0201089 A1* 6/2025 Vanek ...................... G08B 5/36
2025/0297882 A1* 9/2025 Wilcox ................. G01F 23/284

FOREIGN PATENT DOCUMENTS

CN 114250838 A * 3/2022 ............. E03F 1/008
JP 2006078368 A 3/2006
JP 2006078369 A 3/2006
JP 2006078370 A 3/2006
JP 2006078371 A 3/2006
JP 2014002091 A 1/2014
JP 2014006093 A 1/2014
JP 2014006117 A 1/2014

OTHER PUBLICATIONS

U.S. Appl. No. 18/605,908, filed Mar. 15, 2024 (54 pages).
U.S. Appl. No. 18/605,916, filed Mar. 15, 2024 (61 pages).

* cited by examiner

*Primary Examiner* — Vladimir Magloire
*Assistant Examiner* — Eric K Hodac
(74) *Attorney, Agent, or Firm* — Kilyk & Bowersox, P.L.L.C.

(57) ABSTRACT

Provided is a level meter with which a user can easily visually grasp a state of a level of an object from a long distance. The level meter includes a transmission unit that transmits a transmission wave toward an object to one end side in a longitudinal direction, a reception unit that receives a reflected wave of the transmission wave reflected by the object, and a state lamp having a plurality of state LEDs as light sources. A plurality of level ranges is set for the level of the object, and the lighting state of the state lamp changes according to the level range to which the level measured based on the transmission wave and the reflected wave belongs. The state lamp has a transmission window that diffuses the light emitted by the state LED in a direction intersecting the longitudinal direction.

18 Claims, 15 Drawing Sheets

LEVEL METER

CROSS-REFERENCE TO RELATED APPLICATIONS

The present application claims foreign priority based on Japanese Patent Application No. 2023-072442, filed Apr. 26, 2023, the contents of which are incorporated herein by reference.

BACKGROUND OF THE INVENTION

1. Technical Field

The present invention relates to a level meter that measures a level of an object.

2. Description of the Related Art

In a container that stores a flowable substance such as a liquid, a powder, or a granular material, a level meter that measures a height of an interface of the substance, that is, a level (liquid level, powder upper surface level, etc.) may be used. Such a level meter has a function of displaying the measured level to the user.

For example, a level meter described in JP 2014-002091 A includes a display unit that displays a measured liquid level.

In the conventional level meter, the measured level is displayed as a numerical value. For example, in the level meter of JP 2014-002091 A, a 5-digit 7-segment LED (light emitting diode) for displaying the measurement result of the liquid level as a numerical value is provided on the display unit.

However, when the level is displayed as a numerical value, it is difficult for the user to visually grasp the state of the level of the object from a long distance. For example, there is a case where a user monitors a state of a level such as whether a level of an object accommodated in a tank falls within a standard range using a level meter. In this case, the user cannot know the state of the level of the object unless the user approaches the level meter until the numerical value displayed on the display unit can be visually recognized. Therefore, in a case where the level meter is installed at a place far from the user, the user cannot know the level state of the object without moving a long distance. Furthermore, even in a case where the level meter is installed at a place close to the user, if the installation place is a high place or a narrow place, it is difficult for the user to view the display unit of the level meter, and it is difficult for the user to visually grasp the state of the level.

SUMMARY OF THE INVENTION

In view of the above problems, an object of the present invention is to provide a level meter that allows a user to easily visually grasp the state of the level of the object from a long distance.

In order to solve the above problem, a level meter as an example of an embodiment according to the present invention is a level meter for measuring a level of an object, the level meter including: a transmission unit that transmits a radio wave to be a transmission wave toward the object to one end side in a longitudinal direction; a reception unit that receives a reflected wave of the transmission wave reflected by the object; and a state lamp that has a plurality of light sources, in which a plurality of level ranges are set for the level, a lighting state of the state lamp changes according to the level range to which the level measured based on the transmission wave and the reflected wave belongs, and the state lamp has a transmission window that diffuses light emitted from the light source in a direction intersecting the longitudinal direction.

Further, a level meter as another example of the embodiment according to the present invention is a level meter for measuring a level of an object, the level meter including: a transmission unit that transmits a radio wave to be a transmission wave toward the object to one end side in a longitudinal direction; a reception unit that receives a reflected wave of the transmission wave reflected by the object; and a state lamp that has a plurality of light sources and has a transmission window that diffuses light emitted from the light sources, in which a plurality of level ranges are set for the level, a lighting state of the state lamp changes according to the level range to which the level measured based on the transmission wave and the reflected wave belongs, the transmission unit, the reception unit, and the light source of the state lamp are provided on a common sensor board, the transmission unit and the reception unit are disposed on a surface of the sensor board on one end side in the longitudinal direction, and the light source of the state lamp is disposed on a surface of the sensor board on another end side in the longitudinal direction.

According to the present invention, the lighting state of the state lamp changes according to the level range to which the measured level belongs. Furthermore, the light emitted by the light source of the state lamp is diffused in a direction intersecting the longitudinal direction. Therefore, it is easy for the user to visually grasp the state of the level in which level range the level belongs from a long distance.

DETAILED DESCRIPTION

Hereinafter, a level meter 10 as an example of an embodiment according to the present invention will be described with reference to the drawings. In the perspective view of FIG. 1, the level meter 10 of the present embodiment is illustrated. The level meter 10 is a device that measures the level of an object to be measured (for example, liquid, powder, granular material, and the like). The measured level is the height of the interface of the object. Specific examples of the level include the height of the liquid level of the liquid contained in a container.

Figure 1:
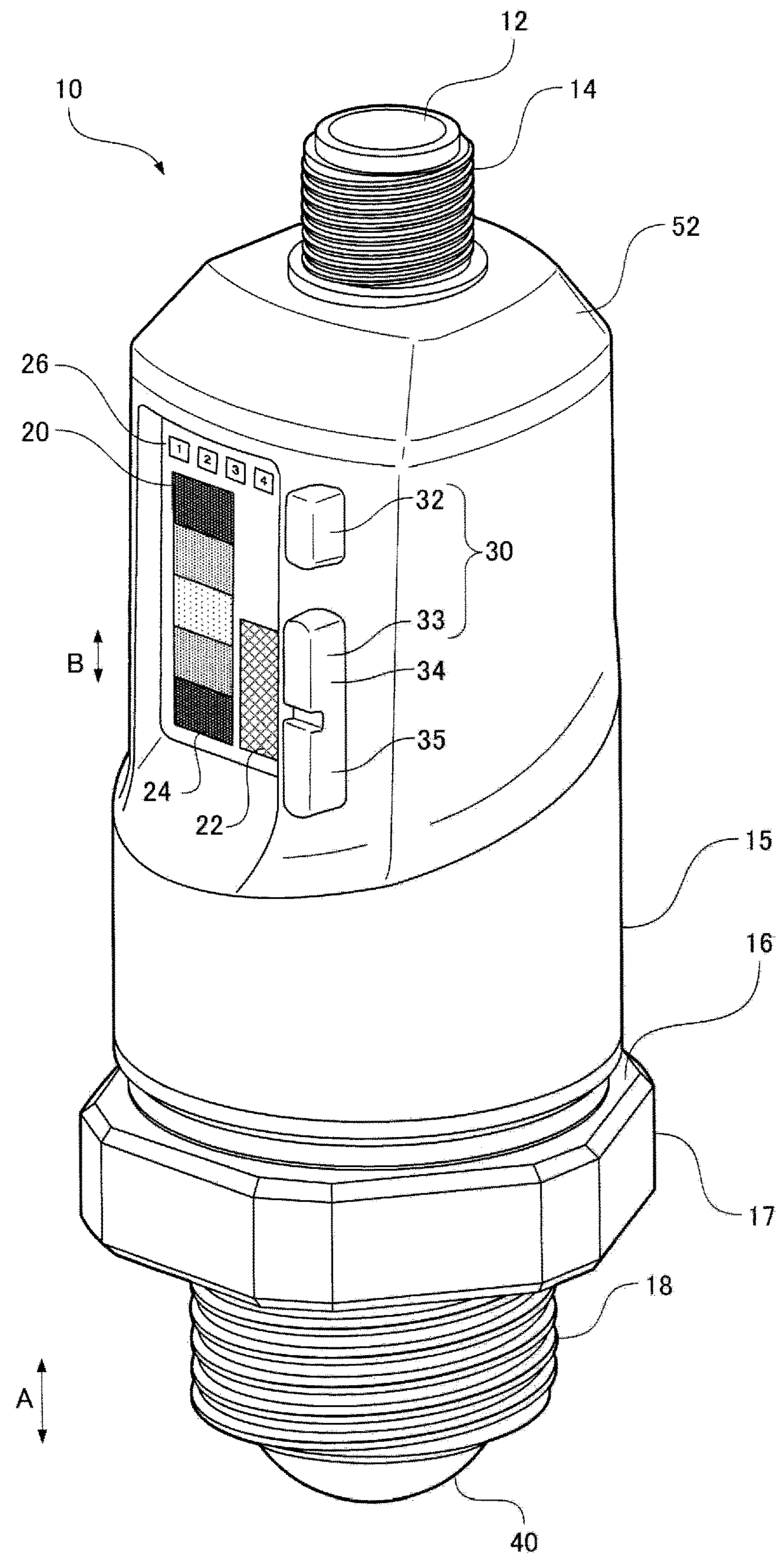
FIG. 1 is a perspective view illustrating a level meter.

The level meter 10 has a longitudinal direction A. In FIG. 1, the level meter 10 has a generally cylindrical shape extending in the longitudinal direction A. The level meter 10 includes a housing 15 and a sensor unit 16, and the housing 15 and the sensor unit 16 are arranged along the longitudinal direction A. The sensor unit 16 is disposed on one end side (lower side in FIG. 1) in the longitudinal direction A of the level meter 10, and the housing 15 is disposed on the other end side (upper side in FIG. 1) in the longitudinal direction A. One end of the sensor unit 16 in the longitudinal direction A is a measurement end unit 40. In FIG. 1, the housing 15 and the sensor unit 16 each include a portion having a cylindrical shape extending in the longitudinal direction A.

Hereinafter, one end side in the longitudinal direction A of the level meter 10 may be referred to as a lower side, and the other end side in the longitudinal direction A may be referred to as an upper side. The sensor unit 16 measures the level of the object with the lower side in the longitudinal direction A facing the object. A measurement axis is set in the sensor unit 16 of FIG. 1. The sensor unit 16 measures the level along the measurement axis. The sensor unit 16 of FIG. 1 measures the level of the object in a state where the measurement end unit 40 faces the object. Here, when the level meter 10 measures the level of the object, it is preferable that a change direction of the level of the object to be measured (for example, liquid such as water) and the longitudinal direction A are the same direction. That is, the direction of the measurement axis of the sensor unit 16 and the longitudinal direction A are preferably the same direction. For example, when the level meter 10 measures the height (level) of the liquid level of the liquid, the longitudinal direction A is preferably the same direction as the change direction of the height of the liquid level of the liquid, that is, the vertical direction (height direction, gravitation direction).

In the level meter 10 of FIG. 1, a radio wave serving as a transmission wave is transmitted from the measurement end unit 40 toward the object, and a reflected wave reflected by the object is received by the measurement end unit 40. The level meter 10 calculates the level of the object based on the transmission wave and the reflected wave.

An attachment screw portion 18 in which a thread is engraved on the surface of the cylinder is provided above the measurement end unit 40 in the sensor unit 16. An attachment portion 17 having a diameter larger than that of the attachment screw portion 18 is provided above the attachment screw portion 18. The attachment portion 17 in FIG. 1 has a nut shape. Note that the attachment portion 17 is not limited to a nut shape as long as it has a structure capable of attaching the level meter 10 to an attachment object (such as a tank that stores liquid). For example, the attachment portion 17 may have a cylindrical shape in which an anti-slip projection is formed. The anti-slip projection of the attachment portion 17 serves as an anti-slip portion when the level meter 10 is attached or detached (rotationally attached or detached) while rotating around the longitudinal direction A with respect to the attachment object. An attachment flange for attaching the level meter 10 to an attachment object may be formed instead of the attachment portion 17 and the attachment screw portion 18. Even when the attachment flange is formed, the attachment portion 17 and the attachment screw portion 18 may be provided in addition to the attachment flange.

The housing 15 disposed above the sensor unit 16 is provided with a display unit 20. The display unit 20 is disposed on an outer peripheral surface of the housing 15 extending along the longitudinal direction A. In FIG. 1, a flat portion along the longitudinal direction A is provided in a part of the outer peripheral surface of the housing 15, and the display unit 20 is disposed in the flat portion. Specifically, the lower portion of the housing 15 has a cylindrical shape surrounded by a curved outer peripheral surface (circular cross section) overlapping the sensor unit 16 along the longitudinal direction, and the upper portion of the housing 15 has a shape surrounded by an outer peripheral surface (D-shaped cross section) including a flat surface and a curved surface. Since the cylindrical portion of the housing 15 overlaps the sensor unit 16 along the longitudinal direction, the cylindrical portion and the sensor unit 16 appear to overlap when viewed from the longitudinal direction. The flat surface of the housing 15 is formed at a position offset toward the measurement axis of the sensor unit 16. The display unit 20 preferably includes an active matrix type display device (active matrix display) capable of displaying various types of information. For example, the display unit 20 includes a liquid crystal display (LCD). In particular, the display unit 20 preferably includes an LCD capable of color display (display with a plurality of colors). The display unit 20 may have a rectangular active matrix display that is long along the longitudinal direction A. That is, the long side of the rectangular active matrix display is preferably along the longitudinal direction A. The outer peripheral surface of the housing 15 on which the display unit 20 is disposed is preferably parallel to the longitudinal direction A, but the outer peripheral surface may be slightly inclined with respect to the longitudinal direction A. Even when the outer peripheral surface is inclined with respect to the longitudinal direction A, if the angle between the outer peripheral surface and the longitudinal direction A is small (for example, 45 degrees or less), it can be said that the outer peripheral surface spreads along the longitudinal direction A.

The display unit 20 displays the level of the object measured by the sensor unit 16. In FIG. 1, a bar graph 22 whose length expands and contracts according to the value of the level is displayed on the display unit 20. An extending direction B of the length of the bar graph 22 is a direction along the longitudinal direction A. The extending direction B is preferably parallel to the longitudinal direction A, but the extending direction B may be slightly inclined with respect to the longitudinal direction A. Even when the extending direction B is inclined with respect to the longitudinal direction A, it can be said that the extending direction B is a direction along the longitudinal direction A as long as the size of the longitudinal direction A component of the bar graph 22 varies according to the variation of the level value. The display unit 20 includes, for example, an active matrix display, and the display unit 20 also displays a gauge 24 divided into a plurality of sections. The gauge 24 indicates which level range the measured level belongs to among a plurality of predetermined level ranges. It is preferable that the gauge 24 is color-displayed (multi-color display), and each section is color-coded. However, the gauge 24 may be displayed in a single color as long as each section can be distinguished. For example, a line indicating separators of the sections may be displayed. Alternatively, each section may be divided according to color shading. The bar graph 22 is displayed next to the gauge 24. In addition, an auxiliary display unit 26 indicating information other than the bar graph 22 and the gauge 24 is also displayed on the display unit 20.

An operation switch 30 is also disposed in a portion of the outer peripheral surface of the housing 15 where the display unit 20 is disposed. The operation switch 30 of FIG. 1 is disposed adjacent to the rectangular active matrix display elongated along the longitudinal direction A, and includes a setting key 32 and a direction key 33 arranged along the longitudinal direction A. The direction key 33 includes an up key 34 and a down key 35 arranged along the longitudinal direction A. The user of the level meter 10 can change the operation parameter of the level meter 10 by operating the operation switch 30. In particular, the user can change the setting of the display content and the level range on the display unit 20 by operating the operation switch 30.

A connection portion 12 is provided on the upper side of the housing 15. The connection portion 12 in FIG. 1 has a cylindrical shape extending along an axis parallel to the longitudinal direction A. An outer peripheral surface of the cylindrical connection portion 12 is a connection screw portion 14 in which a thread is cut.

In addition, a state lamp 52 is provided between the connection portion 12 and the display unit 20 so as to surround the lower side (root) of the connection portion 12. In FIG. 1, since the connection portion 12 has a cylindrical shape extending along the axis parallel to the longitudinal direction A, the state lamp 52 is disposed so as to surround the axis parallel to the longitudinal direction A. The lighting state of the state lamp 52 changes according to the measured level of the object. The user can roughly know the state of the object by visually observing the lighting state of the state lamp 52.

Figure 2:
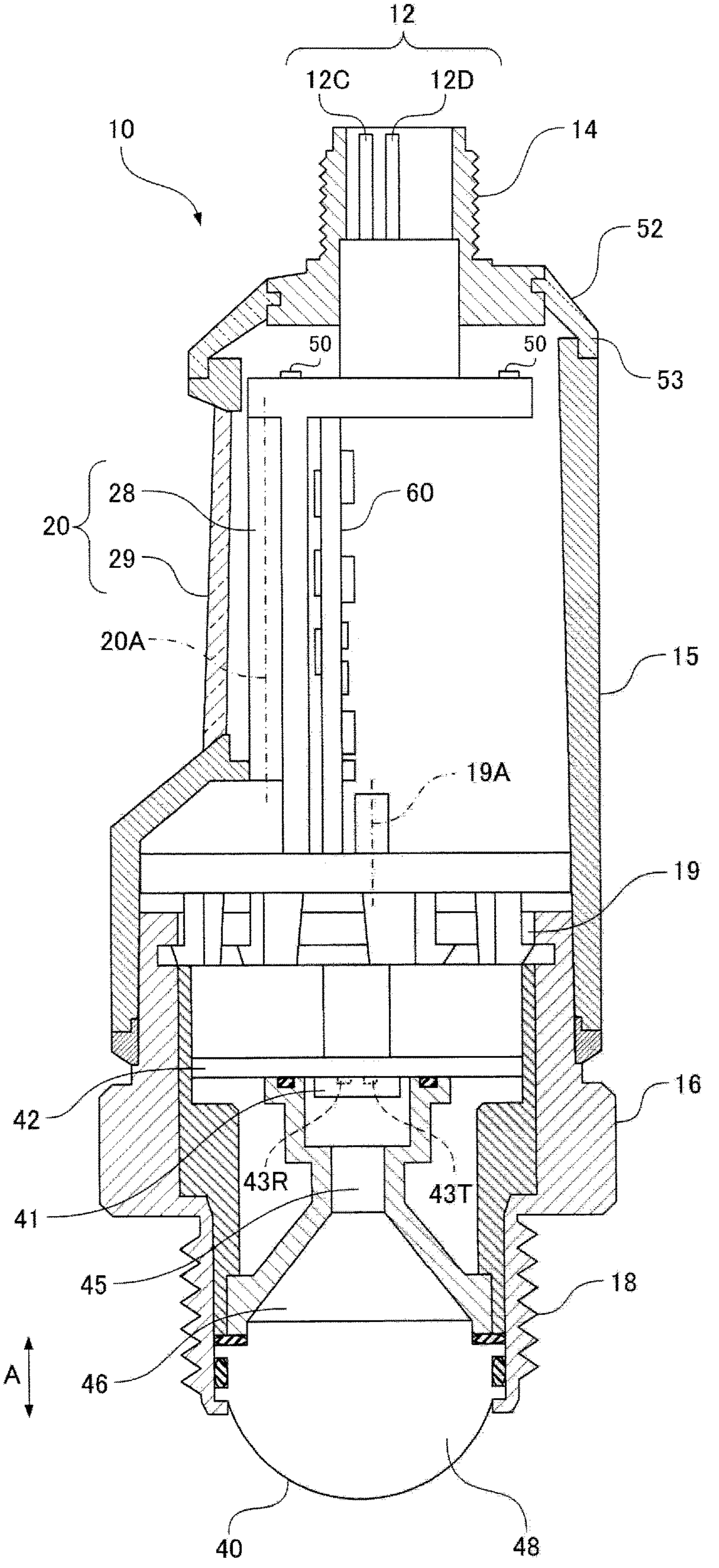
FIG. 2 is a cross-sectional view of the level meter.

An internal structure of level meter 10 will be described with reference to FIG. 2. FIG. 2 is a cross-sectional view illustrating a cross section of the level meter 10 in FIG. 1 taken along a plane (and a plane parallel to the longitudinal direction A) intersecting the display unit 20.

Inside the sensor unit 16, a sensor IC 41 (IC: Integrated Circuit) and a sensor board 42 that supports the sensor IC 41 are arranged. The sensor IC 41 performs transmission and reception of radio waves and signal processing for measuring the level of the object. The signal processed by the sensor IC 41 is transmitted to a display board 60 of the housing 15.

As the sensor IC 41, for example, MMIC (Monolithic Microwave Integrated Circuit) is used. The MMIC is an IC in which a plurality of semiconductor components that perform transmission of radio waves, reception of radio waves, signal processing based on transmitted and received radio waves, and the like are integrated into a single semiconductor device (one chip). In the sensor IC of FIG. 2, an antenna is integrated with the MMIC by using an antenna in package (AiP) technology or an antenna on package (AoP) technology. That is, in FIG. 2, the sensor IC 41 is an antenna-integrated package (antenna on package) in which a transmission unit that transmits a radio wave and a reception unit that receives a radio wave are integrated in a single semiconductor device. Since the antenna-integrated MMIC is used as the sensor IC 41, the volume occupied by the configuration for transmitting and receiving radio waves is reduced, and the entire dimension of the level meter 10 becomes compact. Note that the sensor IC 41 is not limited to the antenna-integrated MMIC alone, and may include a plurality of ICs. The sensor IC 41 may include, for example, an antenna-integrated MMIC and a microcomputer. Then, the antenna-integrated MMIC may include a radio wave transmission antenna, a radio wave reception antenna, and a circuit that executes radio wave transmission/reception control, and the microcomputer may include a circuit that executes signal processing or arithmetic processing based on a reception signal received from the antenna-integrated MMIC.

The sensor IC 41 is mounted on the lower surface of the sensor board 42. The sensor board 42 is an electronic circuit board in which various electronic circuit elements are arranged on a plate made of an insulator such as glass or resin. In FIG. 2, the sensor board 42 is disposed in a direction orthogonal to the longitudinal direction A (horizontal direction in FIG. 2). In a case where the sensor IC 41 is an antenna-integrated MMIC, the sensor IC 41 includes a transmission unit 43T that transmits a radio wave and a reception unit 43R that receives a radio wave. Since the sensor IC 41 includes the transmission unit 43T and the reception unit 43R, the sensor unit 16 includes the transmission unit 43T and the reception unit 43R. By mounting the sensor IC 41 on the lower surface of the sensor board 42, the transmission unit 43T and the reception unit 43R are arranged on the lower surface (one end side in the longitudinal direction A) of the sensor board 42.

The measurement end unit 40 is located below the sensor board 42. The measurement end unit 40 of FIG. 2 includes a waveguide 45, a horn antenna 46, and a dielectric lens 48 as internal structures. In a case where the sensor IC 41 is an antenna-integrated MMIC, a radio wave serving as a transmission wave is transmitted from the sensor IC 41. The transmission wave transmitted from the sensor IC 41 is guided toward the object through the waveguide 45, the horn antenna 46, and the dielectric lens 48 in this order. The reflected wave reflected by the object and incident on the measurement end unit 40 is guided toward the sensor IC 41 through the dielectric lens 48, the horn antenna 46, and the waveguide 45 in this order. Here, when the portion where the attachment screw portion 18 is provided on the lower side of the sensor unit 16 is cylindrical, the cross section thereof is circular. In this case, the circular dielectric lens 48 can be disposed on the lower side (one end side in the longitudinal direction A) of the cylindrical portion. That is, when the sensor unit 16 has a cylindrical portion on the lower side, the cylindrical portion can serve as both a portion to be attached to an installation target (such as a tank) of the level meter 10 and an arrangement place of the dielectric lens 48, and the entire dimension of the level meter 10 becomes compact.

On the other hand, a rotation mechanism 19 is provided inside the housing 15 disposed above the sensor unit 16. The rotation mechanism 19 in FIG. 2 is disposed at a lower end (one end in the longitudinal direction A) of the housing 15, that is, between the housing 15 and the sensor unit 16. The rotation mechanism 19 can relatively rotate the housing 15 with respect to the sensor unit 16 about a rotation axis 19A. For example, the rotation mechanism 19 is a mechanism having a shaft extending along the rotation axis 19A between the housing 15 and the sensor board 42. The shaft is connected to the housing 15 via a bearing or the like arranged around the axis, and is configured such that the rotation of the housing 15 about the rotation axis 19A is not transmitted to the sensor unit 16. In addition, it is preferable that the rotation mechanism 19 can hold the housing 15 and the sensor board 42 in a state where a relative rotation angle between the housing and the sensor board becomes a desired angle. For example, the rotation mechanism 19 may include components such as a damper element serving as a rotational resistance and a rotation lock that prevents rotation so as to be held at a specific rotation angle. In addition to the above configuration, the rotation mechanism 19 may include an engagement protrusion formed on the sensor unit 16 and a plurality of hooks provided on the housing 15. The engagement protrusion is disposed on the outer periphery of the cylindrical portion in the upper portion of the sensor unit 16, and is formed long along the circumferential direction. The engagement protrusion of the sensor unit 16 may have a continuous shape so as to make one round in the circumferential direction. The plurality of hooks of the housing 15 are arranged at intervals in an annular shape corresponding to the engagement protrusion of the sensor unit 16. Each hook engages a lower surface of the engagement protrusion. Each hook rotates while sliding in the circumferential direction when receiving an external force. In addition, in a case where the rotation mechanism 19 includes the engagement protrusion and the hook, the housing 15 may be provided with an elastic body that generates a pressing force that pushes and spreads between the sensor unit 16 and the housing 15. Since the elastic body is provided, sliding resistance between the engagement protrusion and each hook is adjusted. The rotation mechanism 19 of FIG. 2 is disposed such that the rotation axis 19A is oriented in a direction parallel to the longitudinal direction A (vertical direction in FIG. 2). The display unit 20 is arranged on a flat surface formed at a position offset toward the rotation axis 19A in the housing 15. That is, the flat surface of the housing 15 is located away from the plane including the rotation axis 19A. Since the rotation mechanism 19 is provided, the user can turn the display unit 20 in a direction in which it is easy to view by rotating the housing 15. In particular, when the level meter 10 is attached to a container (such as a tank) including a measurement target by the attachment screw portion 18, the user can direct the display unit 20 in a direction in which the user can easily see the display unit without moving the entire level meter 10.

In the housing 15, the display board 60 is disposed above the rotation mechanism 19. The display board 60 is an electronic circuit board in which various electronic circuit elements are arranged on a plate made of an insulator such as glass or resin. In FIG. 2, the display board 60 is disposed in a direction parallel to the longitudinal direction A (vertical direction in FIG. 2). A signal processing circuit for controlling the display unit 20 is mounted on the display board 60. The display board 60 receives a signal from the sensor IC 41, and converts the level of the object measured by the sensor unit 16 into a signal for displaying the level on the display unit 20. The display board 60 of FIG. 2 is disposed on the back side of the display unit 20 (inside the housing 15 in FIG. 2).

The display unit 20 in FIG. 2 includes a display device 28 and a transparent display window 29. The display device 28 is, for example, an LCD, particularly an LCD capable of color display. The display window 29 is, for example, a plate made of an optically transparent material such as glass, acrylic, polyarylate, or polycarbonate, and optically transmits the display content of the display device 28 to the outside of the housing 15. The display device 28 is directed in the direction of the display surface 20A along the longitudinal direction A. In FIG. 2, the display board 60 is directed along the display surface 20A.

Since the display device 28 and the display board 60 are directed in the direction along the longitudinal direction A, the components for operating the display device 28 of the display unit 20 are arranged along the longitudinal direction A (height direction) inside the level meter 10. Therefore, the area occupied by the components for operating the display unit 20 over the direction (radial direction) perpendicular to the longitudinal direction A is reduced, and the entire dimension of the level meter 10 is made compact. In FIGS. 1 and 2, the diameter dimension of the cylindrical housing 15 is smaller than that of the sensor unit 16. Note that the diameter dimension of the housing 15 is not necessarily smaller than that of the sensor unit 16, and the diameter dimensions of the housing 15 and the sensor unit 16 may be the same, or the sensor unit 16 may be smaller.

The state lamp 52 provided between the display unit 20 and the connection portion 12 above the display unit 20 (on the other end side in the longitudinal direction A) includes a plurality of state LEDs 50 (light emitting diodes) serving as light sources and a transmission window 53 that diffuses light emitted from the state LEDs 50 in a direction intersecting the longitudinal direction A. A pillar for supporting a connection portion 12 described later may be provided between the state LED 50 and the transmission window 53. The plurality of state LEDs 50 are disposed above the display board 60 and the display unit 20. The lighting state of the state LED 50 changes according to the level of the object measured by the sensor unit 16. A transmission window 53 including a member (such as a light diffusion film) that diffuses light is disposed above the state LED 50. The light emitted from the state LED 50 is diffused in a direction intersecting the longitudinal direction A through the transmission window 53 and guided to the outside of the housing 15. Therefore, as the lighting state of the state LED 50 changes according to the level of the object, the lighting state of the state lamp 52 changes. In addition, since the transmission window 53 includes a member that diffuses light, and the state lamp 52 (in particular, transmission window 53) is disposed so as to surround the axis parallel to the longitudinal direction A, the light emitted from the state LED 50 is uniformly diffused in all directions around the connection portion 12. Each of the state LEDs 50 may emit light in a single color (for example, red, yellow, green, and the like) or may emit light by switching a plurality of colors (for example, red, yellow, green, and the like). When the state LED 50 emits light by switching a plurality of colors, a plurality of light emitting elements that emit light in different colors may be included in one LED, or a combination of a plurality of LEDs that emit light in different colors may be arranged as the state LED 50. Then, the state LED 50 may emit light by mixing a plurality of colors. When the state LED 50 emits light by switching a plurality of colors, the state LED 50 may emit light in a color corresponding to the color of the section of the gauge 24 corresponding to the level range to which the measured level belongs. In addition, each of the state LEDs 50 is preferably capable of switching among a non-light emitting state (light-off state), a light emitting state, and a blinking state. Note that the light source of the state lamp 52 may be any light source as long as the light source can control the lighting state, and may be, for example, a light emitting element using organic electro luminescence (EL).

The connection portion 12 is disposed on the other end side (upper side) of the display unit 20 in the longitudinal direction A and on the extension of the rotation axis 19A. In FIG. 1, the connection portion 12 is provided at the upper end (the other end in the longitudinal direction A) of the housing 15. The connection portion 12 includes an external input terminal 12C and an external output terminal 12D serving as connection terminals with an external device. The external input terminal 12C is a terminal for inputting a signal or power, or both, from the outside to the level meter 10. The external output terminal 12D is a terminal for outputting a signal from level meter 10 to the outside. The external output terminal 12 may include a plurality of signal lines or a plurality of output terminals. For example, signals may be output from different signal lines or different output terminals to the outside according to the level range to which the measured level belongs. As a specific example, four or five signal lines (or output terminals) may be included in the external output terminal 12 in correspondence with a case where the measured level exceeds or falls below four thresholds described later, a high upper-limit value HH, an upper limit value H, a lower limit value L, and a low lower-limit value LL. Since the connection portion 12 is disposed on the extension of the rotation axis 19A, the position of the connection portion 12 does not change even when the housing 15 is rotated with respect to the sensor unit 16 by the rotation mechanism 19. Therefore, even if the housing 15 is rotated by the rotation mechanism 19, the connection with the outside by the connection portion 12 is not hindered. Note that the position where the connection portion 12 is provided is not limited to the upper end of the housing 15. For example, the connection portion 12 may be disposed at a position on the surface of the housing 15 where the user can access (approach) the display unit 20 from the direction in which the user visually recognizes the display unit. In this case, it is expected that there is no obstacle in the direction in which the user visually recognizes the display unit 20 in order to make the display unit 20 visible to the user. Therefore, when the connection portion 12 is provided at a position where the user can access the display unit 20 from the direction in which the user visually recognizes the display unit, a space for routing the cable connected to the connection portion 12 is easily secured, and the level meter 10 is easily installed. Furthermore, the connection portion 12 may be disposed on the back surface with respect to the display unit 20. In this case, since the connection portion 12 can be provided in an unused dead space, the level meter 10 can be downsized. The external output terminal 12 may include a plurality of signal lines or a plurality of output terminals. For example, signals may be output from different signal lines or different output terminals to the outside according to the level range to which the measured level belongs. As a specific example, four or five signal lines (or output terminals) may be included in the external output terminal 12 in correspondence with a case where the measured level exceeds or falls below four thresholds described later, a high upper-limit value HH, an upper limit value H, a lower limit value L, and a low lower-limit value LL.

Figure 3:
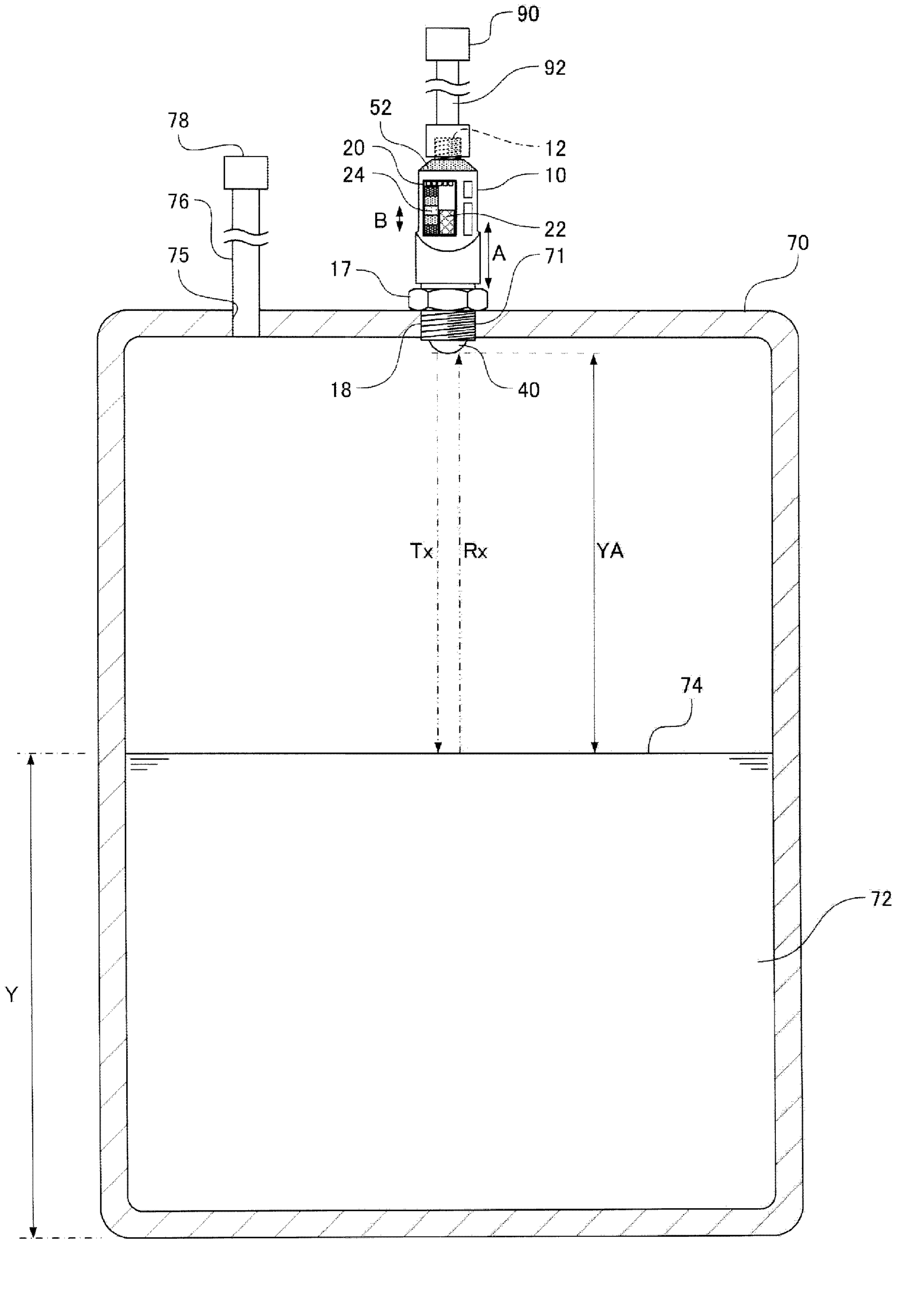
FIG. 3 is a view illustrating a state in which a level meter is attached to a tank that contains an object.

Next, an example of a use state of the level meter 10 will be described with reference to FIG. 3. FIG. 3 is a view illustrating a state in which the level meter 10 is attached to a tank 70 that houses an object 72. The object 72 is, for example, a liquid such as water, and a level Y of the object 72 is a height from the bottom of the tank 70 to an interface 74 (liquid level) of the object 72.

The tank 70 contains water to be the object 72 in, for example, a water treatment facility. For example, when the object 72 in the tank 70 is supplied to a water treatment process or the like, the level Y of the object 72 in the tank 70 decreases. In addition, as the tank 70 is replenished with the object 72, the level Y of the object 72 in the tank 70 increases. For example, a water injection port 75 is provided in an outer wall (an upper wall in FIG. 3) of the tank 70. A water injection pipe 76 is fluidly connected to the tank 70 via the water injection port 75. The water injection pipe 76 is connected to a water injection device 78 (device including, for example, a pump, a valve or the like) provided outside the tank 70. The water injection device 78 is a device that supplies (injects) the object 72 from the outside of the tank 70 into the tank 70. The water injection device 78 adjusts the amount of water injected into the tank 70 according to the level Y of the object 72 in the tank 70. In addition, the water injection device 78 stops the water pouring depending on the level Y of the object 72 in the tank 70. The water injection device 78 controls the replenishment of the object 72 to the tank 70 according to the level Y of the object 72 in the tank 70 such that the level Y of the object 72 in the tank 70, which decreases as the object 72 is consumed, for example, by the water treatment process, falls within a predetermined range.

The level meter 10 in FIG. 3 is attached to the upper side of the tank 70. An attachment hole 71 is provided above the tank 70. The attachment hole 71 is a screw hole, and the attachment screw portion 18 of the level meter 10 is screwed into the attachment hole 71, whereby the level meter 10 is attached to the tank 70. For example, the user of the level meter 10 can screw the attachment screw portion 18 into the attachment hole 71 by rotating the nut-shaped attachment portion 17 with the tip of the attachment screw portion 18 aligned with the attachment hole 71. The structure for attaching the level meter 10 to the tank 70 is not limited thereto. For example, the attachment hole 71 is not threaded, and a nut is separately screwed to the attachment screw portion 18 exposed to the inside of the tank 70, whereby the level meter 10 may be attached to the tank 70. Further, the level meter 10 may be attached to a mounting bracket which is provided above the tank 70 with an upper surface of the tank 70 opened by using a nut and the attachment screw portion 18. In addition, the method of attaching the level meter 10 to the tank 70 is not limited to the screwing using the attachment screw portion 18, and the thread may not be formed on the outer peripheral surface of the sensor unit 16. For example, a flange may be provided on one or both of the level meter 10 and the tank 70, and the level meter 10 may be attached to the tank 70 by fixing the flange to the level meter 10 or the tank 70 with a bolt.

In FIG. 3, the longitudinal direction A of the level meter 10 in a state of being attached to the tank 70 is the same direction as the change direction of the level Y of the object 72. In addition, the length direction (extending direction B) of the bar graph 22 and the gauge 24 displayed on the display unit 20 is also the same direction as the change direction of the level Y.

The level meter 10 transmits a radio wave to be a transmission wave Tx from the measurement end unit 40 toward the object 72. Then, a reflected wave Rx resulting from reflection of the transmission wave Tx at the interface 74 of the object 72 is received by the measurement end unit 40. The level meter 10 calculates the level Y of the object 72 based on the transmission wave Tx and the reflected wave Rx. For example, in the case of performing the measurement using the time of flight (ToF) method, the level meter 10 calculates a distance YA from the measurement end unit 40 to the interface 74 based on the difference between the transmission wave Tx and the reflected wave Rx, and calculates the level Y based on the distance YA. In addition, for example, in a case where measurement is performed by a radar method using a frequency modulated continuous wave (FMCW), the level meter 10 calculates the distance YA from the measurement end unit 40 to the interface 74 based on a frequency of a waveform obtained by mixing the transmission wave Tx and the reflected wave Rx, and calculates the level Y based on the distance YA.

A connection cable 92 is connected to the connection portion 12 of the level meter 10. The connection cable 92 connects a control device 90 (such as a programmable controller) provided outside the tank 70 and the level meter 10. An analog signal indicating the level Y of the object 72 measured by the level meter 10 or a control signal based on a comparison result between the level Y of the object 72 measured by the sensor unit 16 and a threshold is transmitted to the control device 90 via the connection cable 92. The control device 90 controls the operation of the water injection device 78 according to the measured level Y.

Figure 4A:
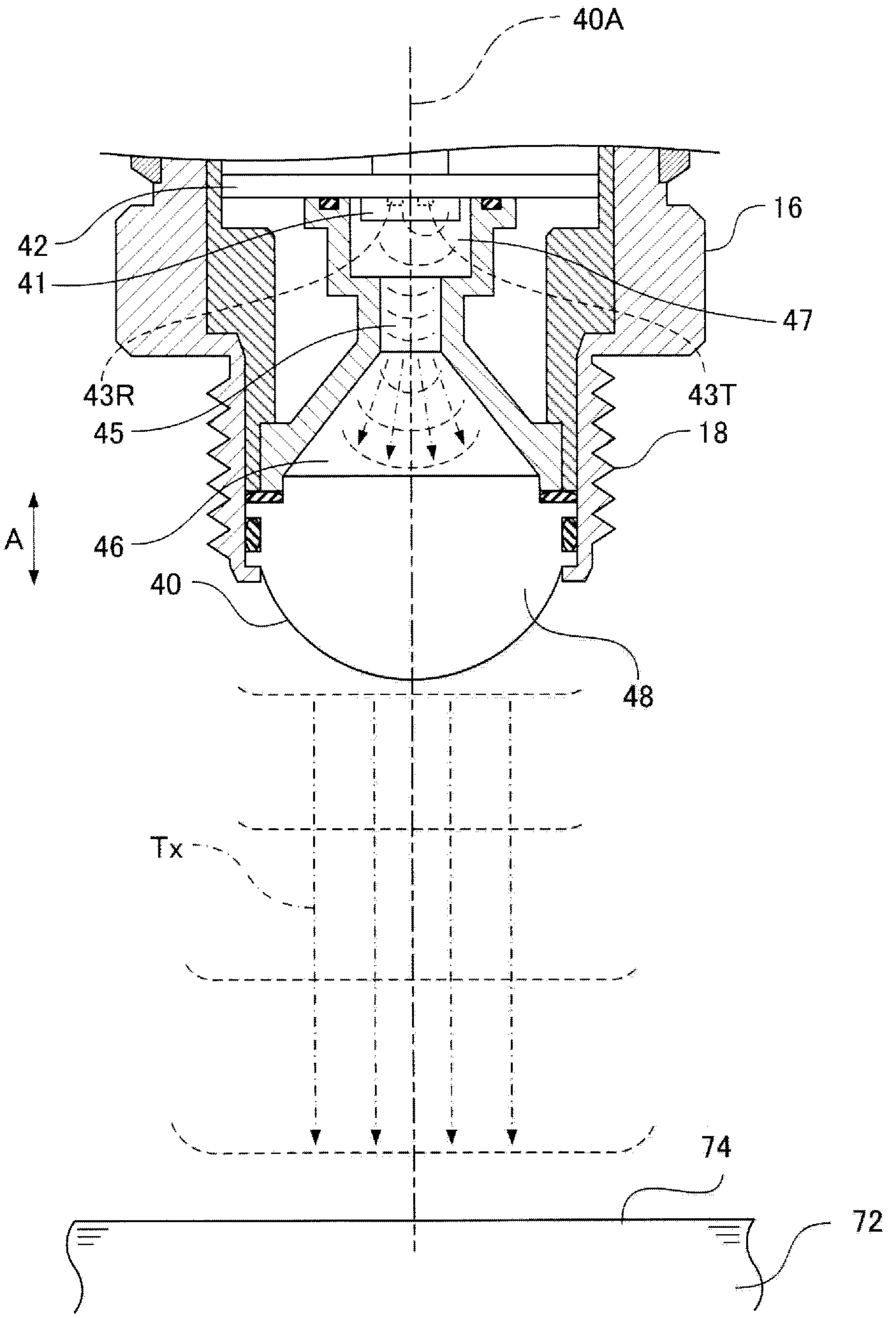
FIG. 4A is a view illustrating a traveling path of a transmission wave.
Figure 4B:
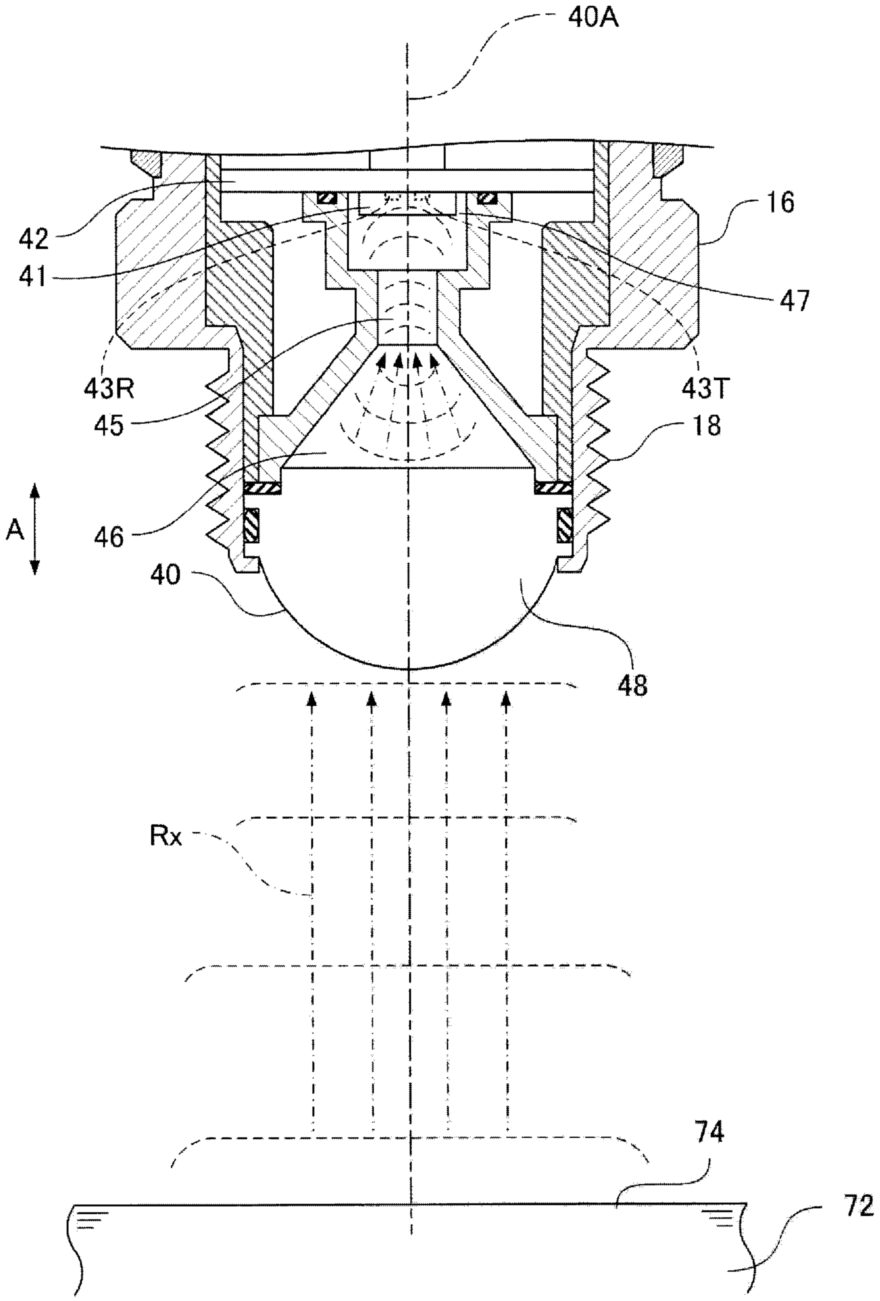
FIG. 4B is a view illustrating a traveling path of a reflected wave.

FIG. 4A is a view illustrating a traveling path of transmission wave Tx. FIG. 4B is a view illustrating a traveling path of the reflected wave Rx. Referring to FIGS. 4A and 4B, the transmission wave Tx is guided to the object 72 through the horn antenna 46 and the dielectric lens 48, and the reflected wave Rx is guided to a reception unit 43R.

The sensor unit 16 includes a transmission unit 43T that transmits the transmission wave Tx and a reception unit 43R that receives the reflected wave Rx. Specifically, the sensor IC 41 disposed inside the sensor unit 16 includes the transmission unit 43T and the reception unit 43R. The transmission unit 43T and the reception unit 43R are a semiconductor electromagnetic wave generating device and a semiconductor electromagnetic wave receiving device mounted on a chip of the sensor IC 41, respectively.

A surrounding wall 47, a waveguide 45, a horn antenna 46, and a dielectric lens 48 are provided between the transmission unit 43T and the object 72 in order of proximity to the transmission unit 43T. The surrounding wall 47 surrounds a space that the transmission unit 43T and the reception unit 43R on the sensor board 42 face and communicates with the waveguide 45. The surrounding wall 47 has conductivity. A radio wave absorber that absorbs radio waves may be provided on the inner wall surface of the surrounding wall 47. The waveguide 45 is a hollow pipe formed of a conductor. The horn antenna 46 is surrounded by a tapered wall surrounding a space communicating with the waveguide 45. The tapered wall of the horn antenna 46 has conductivity, and a radio wave absorber that absorbs radio waves may be provided on an inner wall surface thereof. These are arranged such that the directions of the directivities of the waveguide 45 and the horn antenna 46 coincide with the optical axis 40A of the dielectric lens 48. In FIGS. 4A and 4B, the measurement end unit 40 is disposed such that the optical axis 40A is parallel to the longitudinal direction A (the length direction of the level meter 10). Hereinafter, the directions of the directivities of the waveguide 45 and the horn antenna 46 may also be referred to as an optical axis 40A.

The transmission wave Tx transmitted from the transmission unit 43T passes through the space in the surrounding wall 47 and the waveguide 45, and then is incident on the dielectric lens 48 via the horn antenna 46. In FIGS. 4A and 4B, the equiphase surface of the radio wave is indicated by a broken line in the surrounding wall 47, in the horn antenna 46, and below the measurement end unit 40. Note that, in the waveguide 45, the equiphase surface should originally be shown linearly, but a curved broken line bulging toward the traveling direction side (lower side in FIG. 4A, upper side in FIG. 4B) is shown in order to make the traveling direction of the radio wave easy to understand. The waveguide 45 converts the transmission wave Tx such that the transmission wave Tx becomes a spherical wave traveling in a spherical shape along the optical axis 40A from the emission end of the waveguide 45 regardless of the relative positional relationship between the transmission unit 43T and the waveguide 45. As a result, the emission end of the waveguide 45 can be regarded as a dot-liked transmission source. The diameter of the waveguide 45 may be set to a diameter that allows only the radio wave in the fundamental mode to pass through the waveguide 45 so that the emission end of the waveguide 45 becomes an ideal dot-like transmission source. On the other hand, when the diameter of the waveguide 45 is smaller than half the wavelength of the radio wave, the radio wave does not pass through the waveguide 45. For example, when the frequency of the radio wave is 50 GHz to 70 GHz, the wavelength is about 4.3 mm to about 6.0 mm, and the half wavelength is about 2.15 mm to about 3.0 mm. In this case, when a diameter larger than 3 mm and smaller than 4.3 mm is selected as the diameter of the waveguide 45, only the radio wave in the fundamental mode can pass through the waveguide 45. The diameter of the waveguide 45 satisfying the above condition is, for example, 4 mm. When the dimension of the waveguide 45 in the direction along the optical axis 40A is short, even if the diameter of the waveguide 45 satisfies the above condition, radio waves other than the fundamental mode also pass through the waveguide 45. For example, the dimension of the waveguide 45 in the direction along the optical axis 40A may be set to a length equal to or longer than one wavelength of the wavelength of the radio wave. Note that the longer the dimension of the waveguide 45 in the direction along the optical axis 40A, the longer the dimension of the level meter 10 in the longitudinal direction A. After passing through the waveguide 45, the transmission wave Tx travels as a spherical wave in the horn antenna 46 and is converted into a plane wave via the dielectric lens 48.

As illustrated in FIG. 4A, the transmission wave Tx travels as a spherical wave in the horn antenna 46, and then the transmission wave Tx incident on the dielectric lens 48 is refracted between the horn antenna 46 and the dielectric lens 48 and between the dielectric lens 48 and ambient air (atmosphere), and is guided in a direction parallel to the optical axis 40A. Since the optical axis 40A is parallel to the longitudinal direction A, the transmission wave Tx is guided in a direction in which one end (lower side) of the sensor unit 16 in the longitudinal direction A is directed, that is, in a direction of the object 72. The transmission wave Tx travels as a plane wave corresponding to the effective diameter of the dielectric lens 48 and a diffracted wave around the plane wave. The transmission wave Tx forms a radio wave beam having high directivity. Therefore, since the region of the detection target surface (the region on which the transmission wave Tx strikes in the interface 74 of the object 72) is narrowed, unnecessary reflection due to surrounding obstacles or the like is reduced.

The transmission wave Tx guided to the object 72 is reflected at the interface 74 of the object 72 and becomes a reflected wave Rx. As illustrated in FIG. 4B, the reflected wave Rx traveling as a plane wave is received at the measurement end unit 40. The reflected wave Rx received by the measurement end unit 40 first enters the dielectric lens 48. The reflected wave Rx incident on the dielectric lens 48 is refracted between the ambient air and the dielectric lens 48 and between the dielectric lens 48 and the horn antenna 46, and travels in the horn antenna 46 as a spherical wave approaching the optical axis 40A. As a result, the reflected wave Rx is guided to the reception unit 43R as a radio wave emitted from a dot-liked transmission source at the end portion on the surrounding wall 47 side via the waveguide 45.

The waveguide 45, the horn antenna 46, and the dielectric lens 48 arranged inside the sensor unit 16 guide the traveling direction of the radio wave to the direction of the optical axis 40A by each directivity with respect to the radio wave, and thus they exhibit strong directivity with respect to the radio wave as a whole by combining them. Therefore, the sensor unit 16 can appropriately guide the transmission wave Tx and the reflected wave Rx even if the length direction dimension (length along the longitudinal direction A) is small. In addition, by appropriately guiding the transmission wave Tx and the reflected wave Rx, the transmission of the transmission wave Tx and the reception of the reflected wave Rx can be performed by the common measurement end unit 40 even though the position of the transmission unit 43T and the position of the reception unit 43R are different in the sensor IC 41. Therefore, by using the waveguide 45, the horn antenna 46, and the dielectric lens 48, the designer of the level meter 10 can reduce the dimension in the length direction of the level meter 10 including the sensor unit 16, and the dimension of the entire level meter 10 can be made compact.

Figure 5:
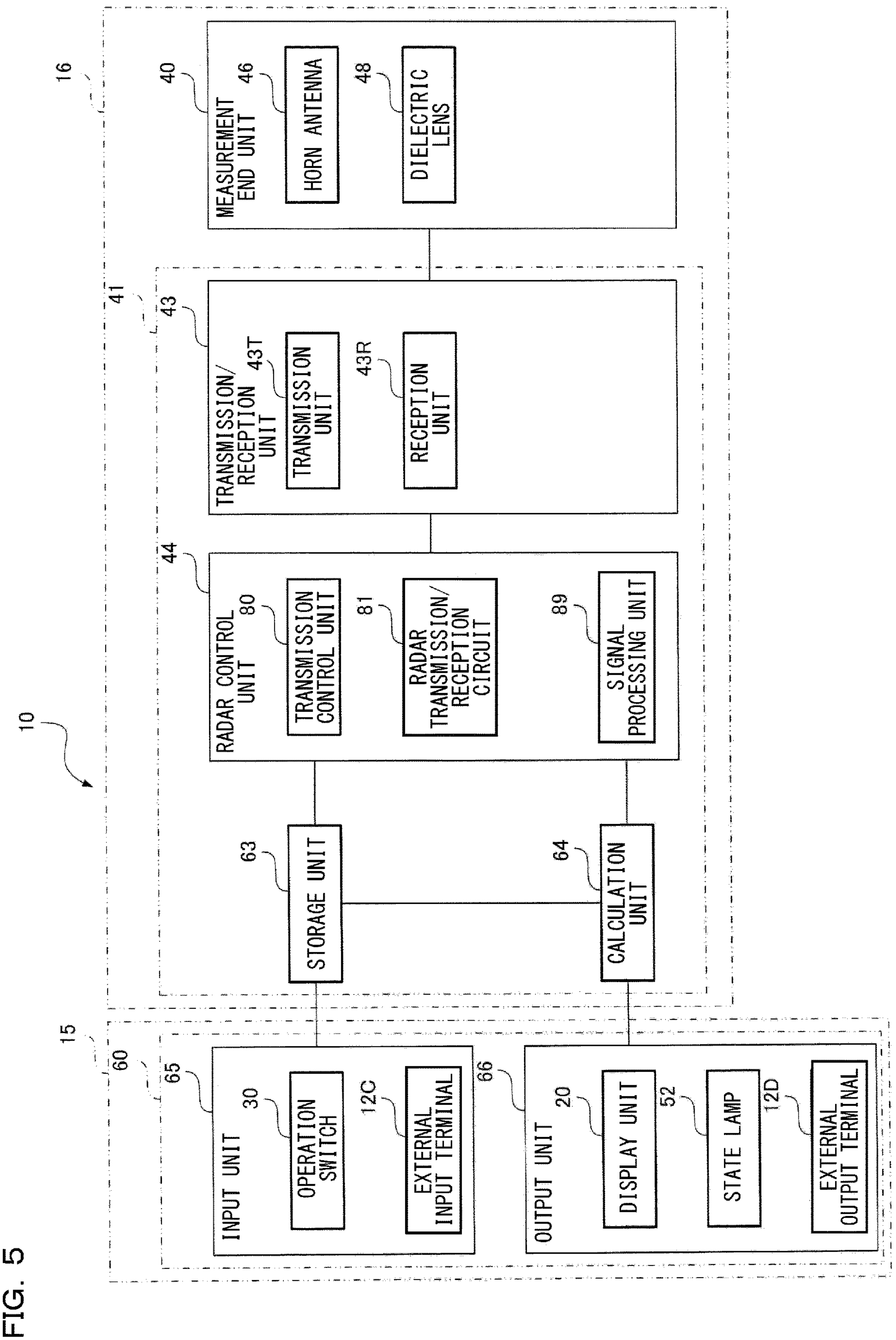
FIG. 5 is a block diagram schematically illustrating an example of a relationship between components of the level meter.

Next, a relationship between the components of the level meter 10 will be described with reference to FIG. 5. FIG. 5 is a block diagram schematically illustrating an example of a relationship between the components of the level meter 10. As illustrated in FIG. 5, the sensor IC 41 of the sensor unit 16 includes a transmission/reception unit 43, a radar control unit 44, a storage unit 63, and a calculation unit 64. The transmission/reception unit 43 includes a transmission unit 43T that transmits the transmission wave Tx and a reception unit 43R that receives the reflected wave Rx. The sensor IC 41 may include a plurality of ICs. For example, the sensor IC 41 may include an antenna-integrated MMIC and a microcomputer.

The radar control unit 44 includes a transmission control unit 80 that determines the waveform of the transmission wave Tx, a radar transmission/reception circuit 81 that performs mutual conversion between a digital signal and a radio wave, and a signal processing unit 89 that performs signal processing based on the transmission wave Tx and the reflected wave Rx. When the sensor IC 41 includes the antenna-integrated MMIC and the microcomputer, the antenna-integrated MMIC may include a portion (the transmission control unit 80 and the radar transmission/reception circuit 81) of the radar control unit 44 excluding the signal processing unit 89 and the transmission/reception unit 43, and the microcomputer may include the signal processing unit 89, the storage unit 63, and the calculation unit 64.

The storage unit 63 stores various setting values (data) related to the operation of the level meter 10. The calculation unit 64 performs various calculations relating to the operation of the level meter 10 based on the setting values stored in the storage unit 63, the signal processing result of the signal processing unit 89, and the like. The storage unit 63 includes a storage device such as a random access memory (RAM) and a read only memory (ROM). The calculation unit 64 includes a processor such as a central processing unit (CPU). Note that the storage unit 63 and the calculation unit 64 may be provided on the display board 60 of the housing 15. Alternatively, the storage units 63 and the calculation units 64 may be separately provided in the sensor unit 16 and the housing 15, respectively, and stored data and responsible arithmetic processing may be shared by the sensor unit 16 and the housing 15.

On the other hand, the display board 60 of the housing 15 includes an input unit 65 and an output unit 66. The input unit 65 is an interface circuit that inputs an input provided from the outside of the level meter 10 to the level meter 10 as a signal. The input provided from the outside of the level meter 10 is, for example, a user's operation on the operation switch 30, a control signal provided from an external device (such as the control device 90 or the like) via the external input terminal 12C, and the like. The input unit 65 causes the storage unit 63 to store, for example, flag information indicating that the operation switch 30 has been operated, and data such as a setting value provided via the external input terminal 12C.

The output unit 66 is an interface circuit that outputs a signal generated inside the level meter 10 to the outside. The output unit 66 changes, for example, the display content of the display unit 20, the lighting state of the state lamp 52, and the like according to the calculation result (such as the value of the level Y) by the calculation unit 64. In addition, the output unit 66 transmits the calculation result by the calculation unit 64 to an external device via the external output terminal 12D.

Figure 6:
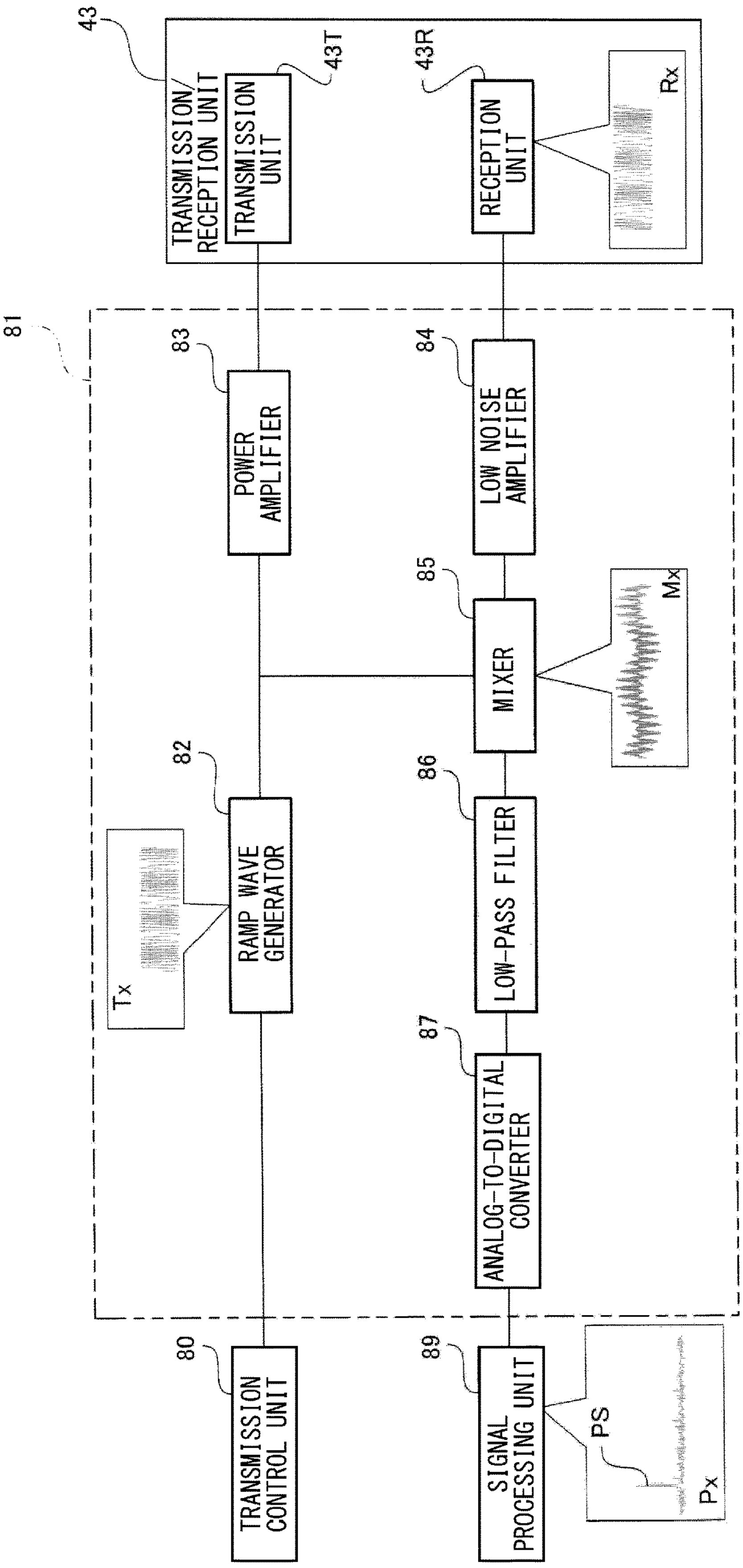
FIG. 6 is a view illustrating an example of a configuration of a radar control unit and a transmission/reception unit.
Figure 7:
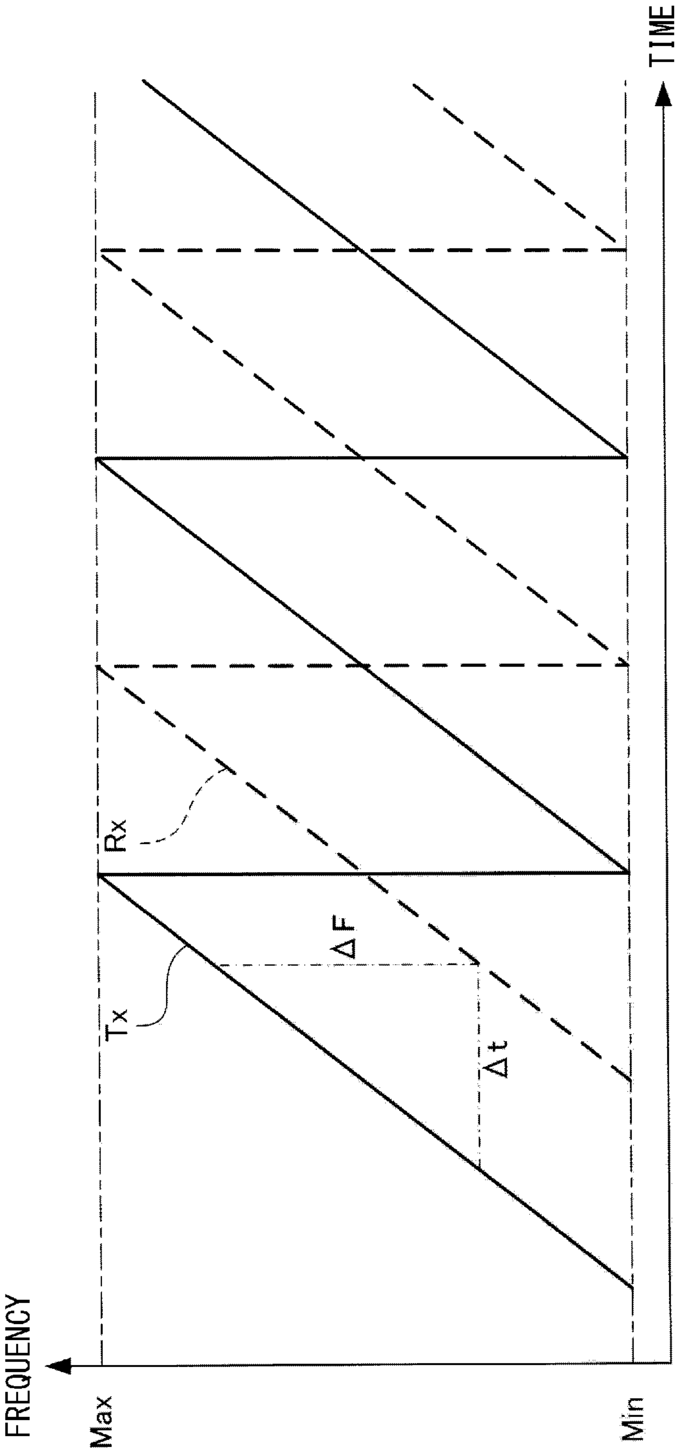
FIG. 7 is a view illustrating a relationship between a transmission wave and a reflected wave.

The measurement of the level Y by the level meter 10 will be described in more detail with reference to FIGS. 6 and 7. FIG. 6 is a view illustrating an example of configurations of the radar transmission/reception circuit 81 and the transmission/reception unit 43 included in the sensor IC 41. FIG. 7 is a view illustrating a relationship between a transmission wave Tx and a reflected wave Rx.

As illustrated in FIG. 6, the radar transmission/reception circuit 81 includes a ramp wave generator 82, a power amplifier 83, a low noise amplifier 84, a mixer 85, a low-pass filter 86, and an analog-to-digital converter 87.

The level meter 10 of the present embodiment measures the level Y by a radar method using FMCW. The ramp wave generator 82 is connected to the transmission control unit 80. When receiving data indicating the waveform of the transmission wave Tx determined by the transmission control unit 80, the ramp wave generator 82 generates a transmission signal having the waveform of the transmission wave Tx according to the data. Here, as the waveform of the transmission wave Tx, a waveform that repeats increase and decrease in frequency is used.

FIG. 7 is a graph illustrating a change in frequency of the transmission wave Tx (and the reflected wave Rx) with respect to time. In FIG. 7, the frequency of the transmission wave Tx increases linearly with time from a minimum value (Min), and returns to the minimum value again when reaching a maximum value (Max). In this manner, the frequency of the transmission wave Tx repeatedly increases and decreases. The increasing/decreasing pattern of the frequency is not limited to this, and for example, a pattern may be used in which the frequency decreases linearly with time from the maximum value and returns to the maximum value again when reaching the minimum value. In addition, a pattern of repeating linear increase/decrease and decrease between the maximum value and the minimum value may be used. The transmission wave Tx used in the present embodiment is a radio wave in the 60 GHz band, and the minimum value of the frequency is, for example, 58 GHz and the maximum value is, for example, 69 GHZ. The frequency band to be used is not limited thereto, and for example, a frequency of 77 GHz to 81 GHz may be used.

The transmission signal generated by the ramp wave generator 82 in FIG. 6 is amplified by the power amplifier 83 and sent to the transmission unit 43T. The transmission unit 43T generates a radio wave having a waveform corresponding to the transmission signal and transmits the radio wave as a transmission wave Tx to the object 72. The transmission wave Tx is reflected by the interface 74 of the object 72 to become a reflected wave Rx, and is received as a reception signal by the reception unit 43R. The reflected wave Rx is a wave out of phase with respect to the transmission wave Tx.

As indicated by a broken line in FIG. 7, the reflected wave Rx is a wave shifted from the transmission wave Tx by a time difference Δt. The time difference Δt is a value corresponding to the distance YA (FIG. 3) from the measurement end unit 40 to the interface 74 of the object 72. Since the reflected wave Rx reciprocates between the measurement end unit 40 and the object 72, there is a relationship of $\Delta t=2\times YA/c$ where c is the speed of light.

Then, a frequency difference ΔF corresponding to the magnitude of the time difference Δt is generated between the transmission wave Tx and the reflected wave Rx. There is a certain relationship between the frequency difference ΔF and the time difference Δt depending on the waveform of the transmission wave Tx. The waveform of the transmission wave Tx is a waveform whose frequency linearly changes with the lapse of time. That is, there is a certain relationship between the frequency difference ΔF and the time difference Δt according to the frequency change per unit time in the waveform of the transmission wave Tx. For example, the frequency of the transmission wave Tx increases linearly from the minimum value (Min) as time elapses, and reaches the maximum value (Max). In this case, the relationship between the frequency difference ΔF and the time difference Δt is uniquely determined by the difference between the maximum value and the minimum value of the frequency of the transmission wave Tx, which is the bandwidth of frequency modulation, and the relationship of the frequency change with time. Therefore, the level meter 10 can calculate the time difference Δt based on the frequency difference ΔF that is a difference between the transmission wave Tx and the reflected wave Rx. Then, the level meter 10 can calculate the distance YA ($\Delta t\times c/2$) from the time difference Δt. Further, the level meter 10 can calculate the value of the level Y based on the distance YA. Specifically, the difference between the depth of the tank 70 (the distance from the bottom of the tank 70 to the measurement end unit 40) and the distance YA is the value of the level Y. Since there is a certain relationship between the frequency difference ΔF and the time difference Δt depending on the waveform of the transmission wave Tx, the correspondence relationship between the frequency difference ΔF and the distance YA can be obtained in advance. The correspondence relationship between the frequency difference ΔF and the distance YA may be stored in advance in the storage unit 63.

As illustrated in FIG. 6, the reception signal corresponding to the reflected wave Rx received by the reception unit 43R is input to the mixer 85 via the low noise amplifier 84. A transmission signal corresponding to the waveform of the transmission wave Tx output from the ramp wave generator 82 is also input to the mixer 85, and the mixer 85 generates a signal corresponding to a mixed wave Mx obtained by mixing the waveforms of the transmission wave Tx and the reflected wave Rx. Specifically, the mixer 85 mixes the transmission signal and the reception signal to generate an IF signal (IF: intermediate frequency) corresponding to the mixed wave Mx.

The IF signal corresponding to the mixed wave Mx has a waveform including a high frequency component derived from the frequency of the 60 GHz band of the transmission wave Tx and the reflected wave Rx and a low frequency component corresponding to the frequency difference ΔF between the transmission wave Tx and the reflected wave Rx. The IF signal corresponding to the mixed wave Mx is input to the low-pass filter 86, and a low-frequency waveform according to the frequency difference ΔF is extracted. The extracted low-frequency waveform is input to the analog-to-digital converter 87. The analog-to-digital converter 87 converts a low-frequency waveform into a digital value and outputs the digital value to the signal processing unit 89.

The signal processing unit 89 converts the low-frequency waveform output from the analog-to-digital converter 87 into a frequency signal Px by fast Fourier transform frequency signal Px or the like. The frequency signal Px is a signal indicating wave intensity for each frequency, and a frequency corresponding to the maximum peak PS of the frequency signal Px is a frequency difference ΔF between the transmission wave Tx and the reflected wave Rx. The signal processing unit 89 transmits the frequency signal Px to the calculation unit 64 in FIG. 5.

The calculation unit 64 calculates the values of the distance YA and the level Y based on the frequency signal Px. In calculating the values of the distance YA and the level Y, the calculation unit 64 refers to the setting values stored in the storage unit 63. For example, the storage unit 63 stores a correspondence relationship between the frequency difference ΔF and the distance YA, a value (depth of the tank 70) for calculating the level Y from the distance YA, and the like.

Depending on the measurement environment, a peak other than the maximum peak PS may appear in the frequency signal Px due to an element other than the interface 74 of the object 72 (for example, a device such as a stirrer provided in the tank 70). Even if there are a plurality of peaks in the frequency signal Px, the calculation unit 64 can specify only the maximum peak PS derived from the object 72 by appropriately performing calculation. For example, the data of the frequency signal Px obtained in advance in a state where there is no object 72 (state where the tank 70 is empty) may be stored in the storage unit 63. The calculation unit 64 can specify the maximum peak PS derived from the object 72 by examining a difference between the frequency signal Px obtained in a state where the object 72 does not exist and the frequency signal Px obtained in a state where the object 72 exists.

After calculating the frequency difference ΔF corresponding to the maximum peak PS of the frequency signal Px, the calculation unit 64 calculates the values of the distance YA and the level Y based on the frequency difference ΔF and the setting value stored in the storage unit 63. The calculation unit 64 transmits the calculated value of the level Y to the output unit 66. The output unit 66 changes the display content of the display unit 20 and the lighting state of the state lamp 52 according to the value of the level Y. The value of the level Y is sent to the control device 90 (FIG. 3) through the external output terminal 12D. The output unit 66 may output a binary or multi-valued control signal based on the comparison result between the calculated value of the level Y and the threshold to the control device through the external output terminal 12D. In addition, instead of the value of the level Y itself, a signal indicating that specific control according to the state of the level Y is to be executed may be sent to the control device 90. For example, when the level Y is above a certain threshold or below a certain threshold, a signal indicating that the operation of the pump, valve or the like should be changed may be sent to the control device 90.

Figure 8:
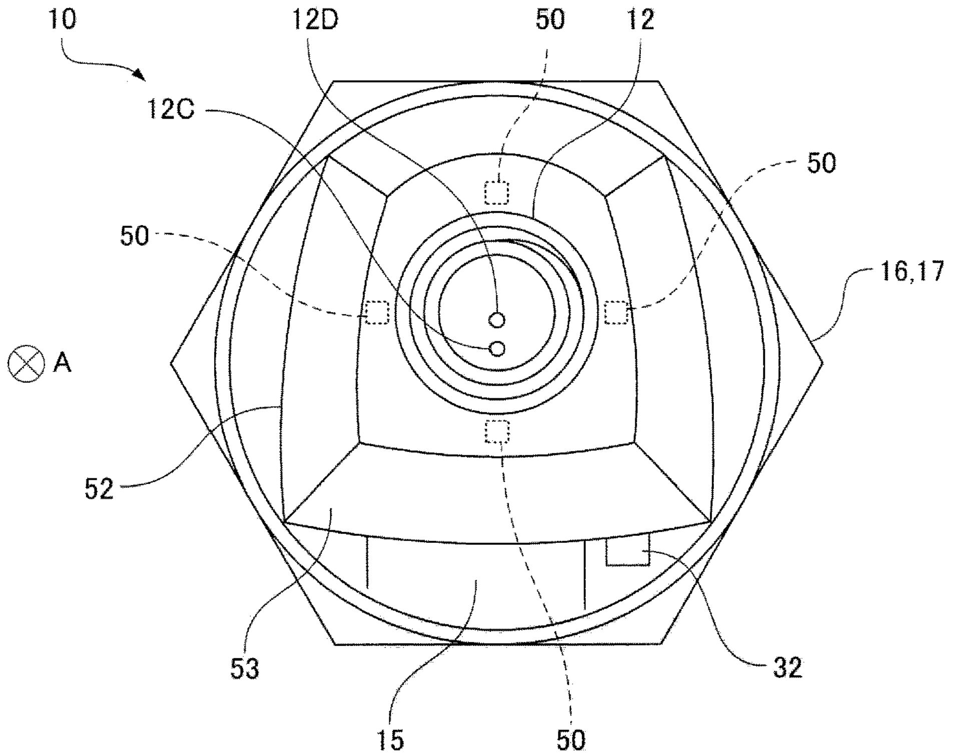
FIG. 8 is a plan view of the level meter.
Figure 9:
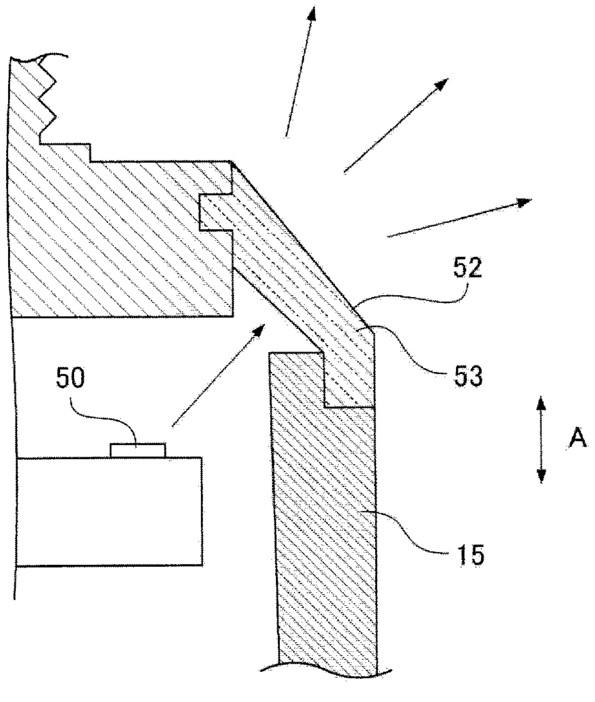
FIG. 9 is an enlarged cross-sectional view illustrating a structure of a state lamp.

Next, the arrangement of the state LED 50 and the transmission window 53 serving as the light source of the state lamp 52 will be described with reference to FIGS. 8 and 9. FIG. 8 is a plan view of the level meter 10, that is, a view of the level meter 10 as viewed from the upper side (the other end side in the longitudinal direction A). FIG. 9 is an enlarged cross-sectional view illustrating a structure of the state lamp 52. As illustrated in FIG. 8, the transmission window 53 of the state lamp 52 is disposed so as to surround the connection portion 12. Since the connection portion 12 has a cylindrical shape extending along an axis parallel to the longitudinal direction A (a direction perpendicular to the paper surface of FIG. 8), the transmission window 53 is disposed so as to surround the axis parallel to the longitudinal direction A (here, the axis of the connection portion 12). In FIG. 8, the transmission window 53 is arranged in all directions (360 degrees around the connection portion 12) with respect to the connection portion 12. The transmission window 53 only needs to surround the axis as a whole, and is not necessarily arranged in all directions. For example, a member that does not transmit light may be disposed in a part of a region along the circumferential direction around the axis parallel to the longitudinal direction A.

A plurality of state LEDs 50 serving as light sources of the state lamps 52 are arranged. In FIG. 8, four state LEDs 50 are arranged. The four state LEDs 50 are spaced apart from each other along a circumferential direction around an axis parallel to the longitudinal direction A (here, the axis of the connection portion 12). The plurality of state LEDs 50 are preferably arranged at equal intervals. When the state LEDs 50 are arranged at equal intervals along the circumferential direction around the axial center, the state lamps 52 as a whole emit light evenly in all directions. In a case where a pillar for supporting the connection portion 12 is provided between the state LED 50 and the transmission window 53, a reflector may be provided in the vicinity of the state LED 50 in order to assist the spread of light from the state LED 50. For example, the reflector may be provided such that the light emitted from the state LED 50 can bypass the pillar and reach the transmission window 53.

As illustrated in FIG. 9, the state LED 50, which is a light source of the state lamp 52, is disposed near the upper end (the other end in the longitudinal direction A) inside the housing 15. The transmission window 53 of the state lamp 52 is disposed on the outer peripheral surface of the housing 15 closer to the upper end than the state LED 50. The transmission window 53 has a tapered surface inclined with respect to the longitudinal direction A, and the light emitted from the state LED 50 is emitted from the tapered surface of the transmission window 53 to the outside of the housing 15.

Further, the transmission window 53 includes a member that diffuses light. A specific example of the member that diffuses light included in the transmission window 53 is a member in which materials having different refractive indexes are combined. For example, transparent fine particles (for example, acrylic resin) having a refractive index different from that of the base material may be added to the surface or the inside of the base material made of a transparent material such as polyethylene terephthalate (PET) resin. When light is incident on the transmission window 53 formed of such a member, the light is refracted in a complicated path due to a difference in refractive index between the base material and the fine particles, and the light emitted from the transmission window 53 is diffused in various directions. Therefore, in combination with the fact that the transmission window 53 has the tapered surface, the light emitted from the transmission window 53 is diffused in the direction intersecting the longitudinal direction A even when the state LED 50 is disposed in the direction parallel to the longitudinal direction A. Note that it is sufficient that at least a part of the light emitted from the transmission window 53 is in a direction intersecting the longitudinal direction A, and the light emitted from the transmission window 53 may include light in a direction parallel to the longitudinal direction A.

By diffusing the light emitted from the transmission window 53 in the direction intersecting the longitudinal direction A, the light of the state lamp 52 can be visually recognized from the direction intersecting the longitudinal direction A (for example, the horizontal direction orthogonal to the longitudinal direction A). Therefore, the user can easily visually grasp the state of the level of the object indicated by the lighting state of the state lamp 52 from a long distance. In addition, the light of the state LED 50 is diffused by the transmission window 53 including a member that diffuses light, so that the light of the state LED 50, which is a point light source, is irradiated in all directions. Therefore, the user can easily visually grasp the state of the level of the object from any direction with respect to the level meter 10.

Figure 10:
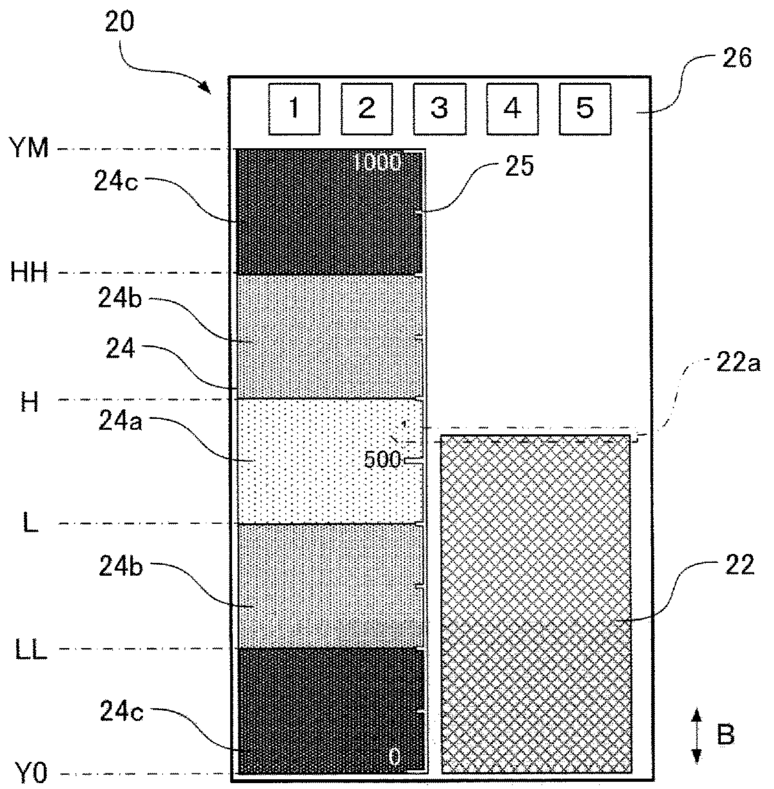
FIG. 10 is a view illustrating a bar graph and a gauge displayed on a display unit.
Figure 11:
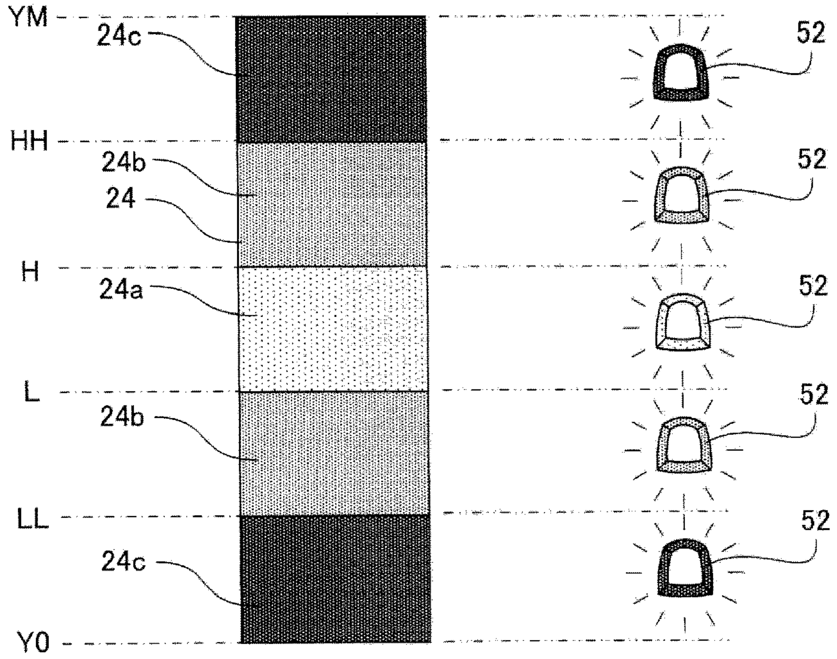
FIG. 11 is a view illustrating a correspondence relationship between a lighting state of the state lamp and a level range.

Next, display contents of the display unit 20 and a lighting state of the state lamp 52 will be described with reference to FIGS. 10 and 11. FIG. 10 is a view illustrating the bar graph 22 and the gauge 24 displayed on the display unit 20. FIG. 11 is a view illustrating a correspondence relationship between the lighting state of the state lamp 52 and the level range. The display unit 20 performs display according to the measured level Y. As illustrated in FIG. 10, display including the bar graph 22 whose length expands and contracts according to the value of the level Y is performed on the display unit 20. In addition to the bar graph 22, the gauge 24 and the auxiliary display unit 26 are displayed on the display unit 20. The bar graph 22 and the gauge 24 are displayed as elongated bars along the extending direction B.

The gauge 24 is displayed with a predetermined length (length specified by the setting value) according to the setting value stored in the storage unit 63 (FIG. 5). The gauge 24 is divided into a plurality of sections along its length direction (extending direction B). In FIG. 10, the gauge 24 is divided into five sections. These sections are divided based on a plurality of predetermined thresholds. The threshold is a part of the setting value stored in the storage unit 63. The threshold is a value determined with respect to the level Y of the object 72, and a numerical range between the thresholds is a plurality of predetermined level ranges. In FIG. 10, four thresholds (HH, H, L, LL) and an upper limit (YM) and a lower limit (Y0) of the measurement range are set, and a numerical range between these values is set as five level ranges for level Y. Each section of the gauge 24 corresponds to each level range. The number of sections of the gauge 24 is not limited to 5. For example, in a case where only either the upper limit or the lower limit of level Y is displayed, the number of sections is two. In addition, in a case where the upper limit and the lower limit of the level Y are displayed, the number of sections is three. As such, the separators of the gauge 24 may have various patterns depending on the elements to be displayed.

Hereinafter, the central section among the five sections illustrated in FIG. 10 is referred to as a standard section 24*a*. Two sections vertically adjacent to the standard section 24*a* are referred to as a warning section 24*b*, and sections vertically separated from the standard section 24*a* with the warning section 24*b* interposed therebetween (sections located at upper and lower ends of the gauge 24) are referred to as dangerous sections 24*c*. When the five sections are distinguished from each other, the upper dangerous section 24*c*, the upper warning section 24*b*, the standard section 24*a*, the lower warning section 24*b*, and the lower dangerous section 24*c* are referred to in order from the top of the gauge 24. The five level ranges corresponding to these five sections are referred to as an upper dangerous range, an upper warning range, a standard range, a lower warning range, and a lower danger range, respectively.

In FIG. 10, the sections of the gauge 24 are color-coded with colors corresponding to the respective level ranges. For example, the standard section 24*a* may be displayed in green corresponding to the standard range, the warning section 24*b* may be displayed in yellow corresponding to the warning range, and the dangerous section 24*c* may be displayed in red corresponding to the dangerous range. Note that the upper warning section 24*b* and the lower warning section 24*b* may have different colors. Similarly, the upper dangerous section 24*c* and the lower dangerous section 24*c* may have different colors. Furthermore, the color of each section may be changed by the operation of the operation switch 30 by the user. In this case, the setting of the color assigned to each section may be selected from a plurality of assignment patterns (combinations) prepared in advance by the operation of the operation switch 30 by the user, or the color assigned to each section may be individually selected. In addition, the lighting state of each section may be selected by the operation of the operation switch 30 by the user. In this case, the lighting state may be selected from among turn-on, turn-off, and blinking.

The bar graph 22 is displayed next to the gauge 24, and its length expands and contracts along the extending direction B according to the measured value of the level Y. When the gauge 24 is color-coded, the bar graph 22 is preferably displayed in a color (for example, blue) different from each section of the gauge 24 so that the user can easily distinguish the bar graph 22 and the gauge 24 even from a long distance. In FIG. 10, the bar graph 22 extends from the lower side to the upper side as the value of the level Y is larger. That is, as the bar graph 22 extends, the tip (upper end) of the length of the bar graph 22 in the extending direction B is separated from one end side (lower side) in the longitudinal direction A. Therefore, the bar graph 22 shows a larger value of the level Y as the tip (upper end) of the length in the extending direction B is farther from one end side (lower side) in the longitudinal direction A. Similarly, the gauge 24 also corresponds to a larger value as it goes away from one end side in the longitudinal direction A. Since the value of the level Y increases as the interface 74 of the object 72 moves away from the bottom surface of the tank 70, the movement of the tip of the bar graph 22 reflects the movement of the interface 74. Therefore, according to the bar graph 22 and the gauge 24 in FIG. 10, it is easy for the user to visually grasp the state of the level Y, that is, which level range the level Y belongs to, and how the level Y fluctuates (increases or decreases).

An example of setting the upper limit and the lower limit of the measurement range will be described. The measurement range indicates the range of the level Y measured by the level meter 10, and for example, the lower limit of the measurement range is a value (zero point Y0, e.g. 0 mm) indicating that the object 72 does not exist in the tank 70 (the tank 70 is empty). The upper limit of the measurement range is a value (full-volume value YM, e.g. 1000 mm) indicating that the tank 70 cannot accommodate the object 72 any more (the tank 70 is full). The upper limit and the lower limit of the measurement range may be set by the user operating the operation switch 30.

An example of setting the threshold will be described. For example, the threshold is set as a value indicating that "If the level Y exceeds or falls below this value, the amount of the object 72 needs to be adjusted" with respect to the object 72 in the tank 70. The threshold may be set by the user operating the operation switch 30. Four thresholds, that is, a high upper-limit value HH (first threshold), an upper limit value H (second threshold), a lower limit value L (third threshold), and a low lower-limit value LL (fourth threshold) are set in order from the full-volume value YM that is the upper limit of the measurement range. The supply of the object 72 in the tank 70 to, for example, a water treatment process lowers the level Y of the object 72 in the tank 70. On the other hand, as the tank 70 is replenished with the object 72, the level Y of the object 72 in the tank 70 rises. In this case, the water injection device 78 controls the replenishment of the object 72 to the tank 70 according to the level Y of the object 72 in the tank 70 such that the level Y of the object 72 in the tank 70 that decreases according to the water treatment process falls within a predetermined range. Specifically, the water injection device 78 controls the replenishment of the object 72 to the tank 70 such that the level Y of the object 72 in the tank 70 is between the upper limit value H (second threshold) and the lower limit value L (third threshold). When the water injection device 78 normally operates, the level Y of the object 72 in the tank 70 falls within the range of the upper limit value H (second threshold) and the lower limit value L (third threshold). However, when the level Y of the object 72 deviates from the predetermined range by a certain amount or more although the water injection device 78 controls the level Y of the object 72 in the tank 70, it is determined that an abnormality has occurred, and the entire operation of facilities (for example, water treatment facilities) including the water injection device 78, the water treatment process device, and the like is stopped. The high upper-limit value HH is a value (for example, 800 mm) at which the entire water treatment facility should be stopped immediately when the level Y exceeds this value. The upper limit value H is a value (for example, 600 mm) at which the water injection into the tank 70 should be stopped when the level Y exceeds this value. The lower limit value L is a value (for example, 400 mm) at which the water injection into the tank 70 should be started when the level Y falls below this value. The low lower-limit value LL is a value (for example, 200 mm) at which the entire water treatment facility should be stopped immediately when the level Y falls below this value.

The upper dangerous section 24*c* corresponds to a level range (upper dangerous range) between the full-volume value YM, which is the upper limit of the measurement range, and the high upper-limit value HH. The upper warning section 24*b* corresponds to a level range (upper warning range) between the high upper-limit value HH and the upper limit value H. The standard section 24*a* corresponds to a level range (standard range) between the upper limit value H and the lower limit value L. The lower warning section 24*b* corresponds to a level range (lower warning range) between the lower limit value L and the low lower-limit value LL. The lower dangerous section 24*c* corresponds to a level range (lower danger range) between the low lower-limit value LL and the zero point Y0 which is the lower limit of the measurement range. A range of each section of the gauge 24 is defined by each corresponding threshold. The display range of each section may have a length corresponding to a threshold defining each section. In this case, when the threshold is changed by the operation of the operation switch 30 by the user, the display range of each section is changed to a length corresponding to the section defined by the changed threshold.

In FIG. 10, the level range to which the level Y belongs is illustrated depending on which position of the section of the gauge 24 the length of the bar graph 22 has reached. More specifically, as the length of the bar graph 22 displayed next to the gauge 24 expands and contracts according to the value of the level Y, the distal end portion (upper end) moves along the extending direction B. The extending direction B indicates a direction in which the length of the bar graph 22 increases or decreases in the display in the display unit 20. The direction in which the length of the bar graph 22 increases or decreases is a direction along the direction in which the level Y of the measurement target increases or decreases. In the display in the display unit 20, the bar graph 22 and the gauge 24 have a common coordinate system along the direction in which the level Y increases or decreases. Then, the level range to which the level Y belongs is indicated depending on which section of the gauge 24 the distal end portion of the bar graph 22 is located next to. Note that an arrow shape 22*a* (an arrow indicated by a two-dot chain line in FIG. 8) extending toward the color gauge 24 may be displayed at the distal end portion of the bar graph 22 so that it is easy to visually understand which section of the color gauge 24 the tip of the bar graph 22 corresponds to.

Here, the level range to which the level Y belongs is specifically information indicating between which two thresholds the measured value of the level Y is. In FIG. 10, which level range the level Y belongs to is displayed depending on which section of the gauge 24 the distal end portion of the bar graph 22 is located next to.

For example, in FIG. 10, the distal end portion of the bar graph 22 is located next to the standard section 24*a*. In this case, the level Y belongs to a level range (standard range) between the upper limit value H and the lower limit value L. Therefore, the user of the level meter 10 can easily visually grasp that the level Y of the object 72 is in a state between the upper limit value H and the lower limit value L by visually observing the bar graph 22 and the gauge 24 of the display unit 20. As described above, according to the level meter 10 of the present embodiment, the user can easily visually grasp the state of the level Y of the object 72 to be measured at the site where the tank 70 is installed.

Further, the state (status) of the object 72 based on the level Y is also indicated by the lighting state of the state lamp 52. For example, as illustrated in FIG. 11, when the level Y belongs to a level range (standard range) corresponding to the standard section 24*a*, the state lamp 52 may be turned on in a first color (for example, green). Further, when the level Y belongs to the level range (warning range) corresponding to the warning section 24*b*, the state lamp 52 may be turned on in a second color (for example, yellow). Further, when the level Y belongs to the level range (danger range) corresponding to the dangerous section 24*c*, the state lamp 52 may be turned on in a third color (for example, red). As described above, when the lighting state of the state lamp 52 changes depending on the level range to which the level Y belongs, the user can more easily and visually grasp the state of the level Y of the object 72. In the display unit 20 of FIG. 10, which section of the gauge 24 the tip of the bar graph 22 corresponds to indicates which level range the level Y belongs to. Therefore, it can be said that the lighting state of the state lamp 52 changes depending on which section of the gauge 24 the tip of the bar graph 22 corresponds to.

In FIG. 11, the lighting state of the state lamp 52 is changed by switching a state in which the state LED 50 of the light source emits light in the first color (for example, green), a state in which the light source is lit in the second color (for example, yellow) different from the first color, and a state in which the light source is lit in colors (third color, e.g. red) different from the first color and the second color. The lighting state of the state lamp 52 is not limited thereto, and may be any state as long as the user can recognize a change in the level state. For example, by combining three states of a state in which the state LED 50 is turned off, a state in which light is emitted, and a state in which light is blinking, and a plurality of emission colors, the state lamp 52 can take a lighting state corresponding to a large number of level ranges. Specifically, by switching at least two of a state in which the state LED 50 of the light source is not emitting light, a state in which the state LED 50 emits light in the first color, a state in which the state LED 50 emits light in a color different from the first color, a state in which the state LED 50 blinks in the first color, and a state in which the state LED 50 blinks in a color different from the first color, the lighting state of the state lamp 52 is preferably changed. Note that the emission colors of the state LEDs 50 are not limited to green, yellow, and red, and may include more colors (for example, purple, white, and the like). The color of each section of the gauge 24 may be changed by the user operating the operation switch 30. The lighting state of the state lamp 52 may also be changed according to the display state of each section of the gauge 24. For example, it is assumed that there are five sections of the gauge 24, and red lighting, yellow lighting, green lighting, yellow lighting, and red lighting are allocated to each section in order from the top. Then, it is assumed that a change is made such that red lighting, yellow blinking, green lighting, turning-off, and red blinking are assigned to each section in order from the top by the user's operation. In this case, if the distal end portion of the bar graph 22 is located next to the second section from the top of the gauge 24, the state lamp 52 lights up in yellow before the assignment is changed, and blinks in yellow after the assignment is changed. In this case, the lighting color of the state lamp 52 may also be changed according to the color of each section of the gauge 24. For example, it is assumed that there are four sections of the gauge 24, and red, yellow, green, and yellow are assigned to each section in order from the top. Then, it is assumed that a change is made by the user's operation so that yellow, green, yellow, and red are assigned to each section in order from the top. In this case, if the distal end portion of the bar graph 22 is located next to the uppermost section of the gauge 24, the state lamp 52 is lit in red before the assignment is changed, and is lit in yellow after the assignment is changed. Note that the color of each section of the gauge 24 and the color of the state lamp 52 corresponding to each section may not necessarily match. For example, when the distal end portion of the bar graph 22 corresponds to a section displayed in yellow, the state lamp 52 may blink in red.

Meanwhile, in FIG. 10, the auxiliary display unit 26 is displayed above the bar graph 22 and the gauge 24. The auxiliary display unit 26 displays information different from the bar graph 22 and the gauge 24. In FIG. 10, the number (1, 2, 3, 4, 5) of the output port that outputs a signal in the level meter 10 is highlighted on the auxiliary display unit 26. For example, each number is displayed in white if the corresponding output port is not outputting a signal, and the number of the output port that is outputting a signal is displayed in red.

The output port is an individual signal line output from the external output terminal 12D of FIG. 2 to the outside of the level meter 10, and for example, a signal of a type corresponding to the level range to which the level Y belongs is output from the output port corresponding to the type of each signal. For example, when the level Y is within the range of the standard section 24*a*, a signal indicating that "the level Y is within the standard range" is output from the first output port to the outside of the level meter 10 (for example, the control device 90). At this time, the number "1" is displayed in red on the auxiliary display unit 26.

When the level Y is in the range of the upper warning section 24*b*, a signal indicating that "the level Y exceeds the upper limit value H" (in the upper warning range) is output from the second output port, and the number "2" is displayed in red. When the level Y is in the range of the lower warning section 24*b*, a signal indicating that "the level Y is below the lower limit value L" (in the lower warning range) is output from the third output port, and the number "3" is displayed in red.

When the level Y is in the range of the upper dangerous section 24*c*, a signal indicating that "the level Y exceeds the high upper-limit value HH" (in the upper dangerous range) is output from the fourth output port, and the number "4" is displayed in red. If the level Y is in the range of the lower dangerous section 24*c*, a signal indicating that "the level Y is below the low lower-limit value LL" (in the lower danger range) is output from the fifth output port, and the number "5" is displayed in red.

Each output port may be associated with each of four thresholds, that is, a high upper-limit value HH (first threshold), an upper limit value H (second threshold), a lower limit value L (third threshold), and a low lower-limit value LL (fourth threshold). For example, if the level Y falls within the range of the standard section 24*a*, the level Y exceeds the lower limit value L (third threshold) and the low lower-limit value LL (fourth threshold), and thus a signal indicating that the threshold is exceeded is output from the third output port and the fourth output port to the outside of the level meter 10 (for example, the control device 90). At this time, the numbers "3" and "4" are displayed in red on the auxiliary display unit 26. In addition, when the level Y is in the range of the upper warning section 24*b*, signals indicating that the threshold has been exceeded are output from the second, third, and fourth output ports, and the number "2", the number "3", and the number "4" are displayed in red. When the level Y is in the range of the lower dangerous section 24*c*, the level Y is below any of the high upper-limit value HH (first threshold), the upper limit value H (second threshold), the lower limit value L (third threshold), and the low lower-limit value LL (fourth threshold). Therefore, a signal indicating that the level Y exceeds the threshold is not output from any of the first, second, third, and fourth output ports, and any of the number "1", the number "2", the number "3", and the number "4" is not displayed in red. Each output port is preferably connected to, for example, the water injection device 78 (FIG. 3). When signals are output from these output ports, the water injection device 78 controls the water pouring into the tank 70 according to the number of the output port. For example, when a signal is output from the second output port corresponding to the upper limit value H (second threshold), the water injection device 78 immediately stops water injection.

Figure 12:
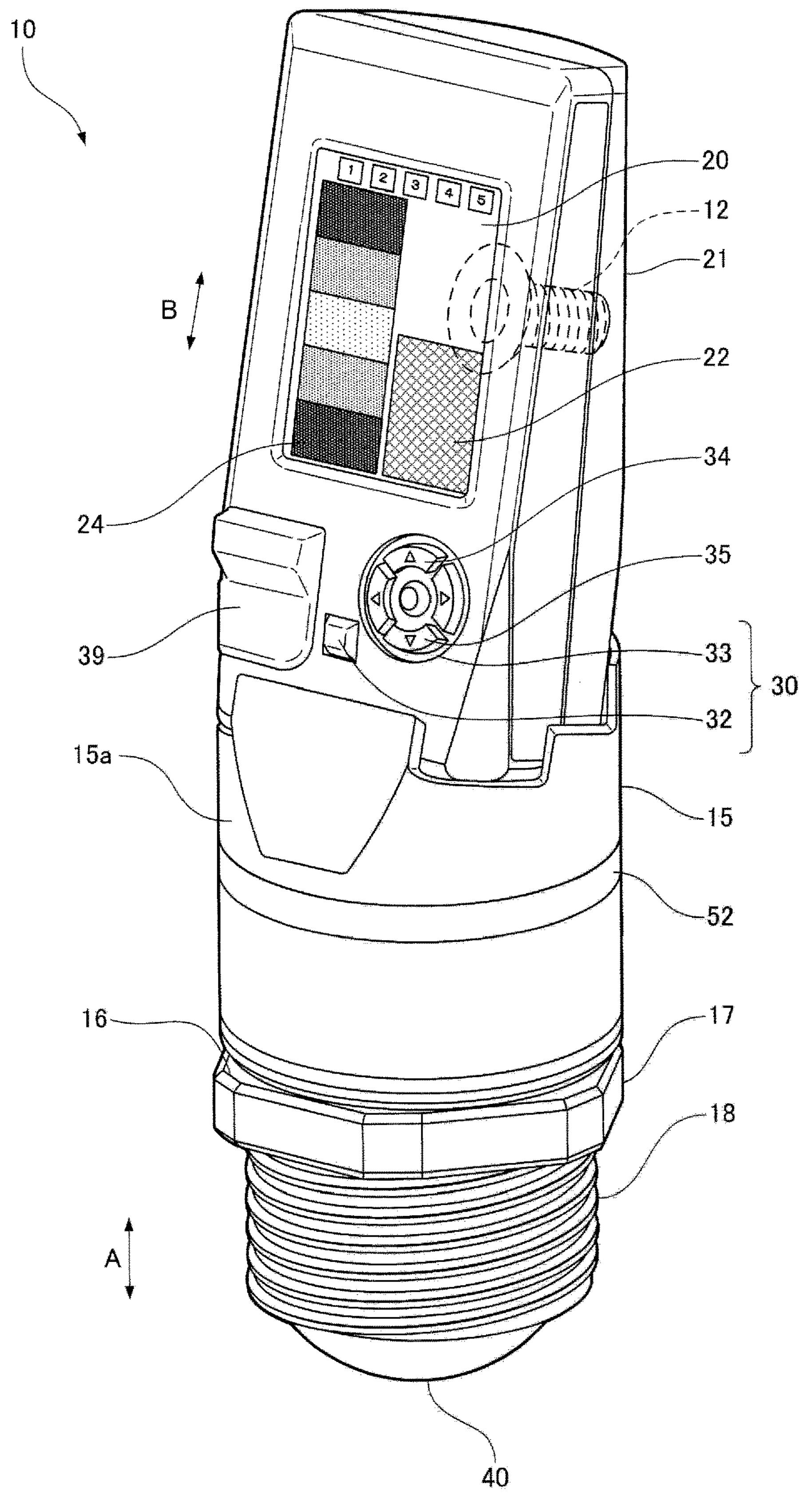
FIG. 12 is a perspective view illustrating a second example of the level meter.
Figure 13:
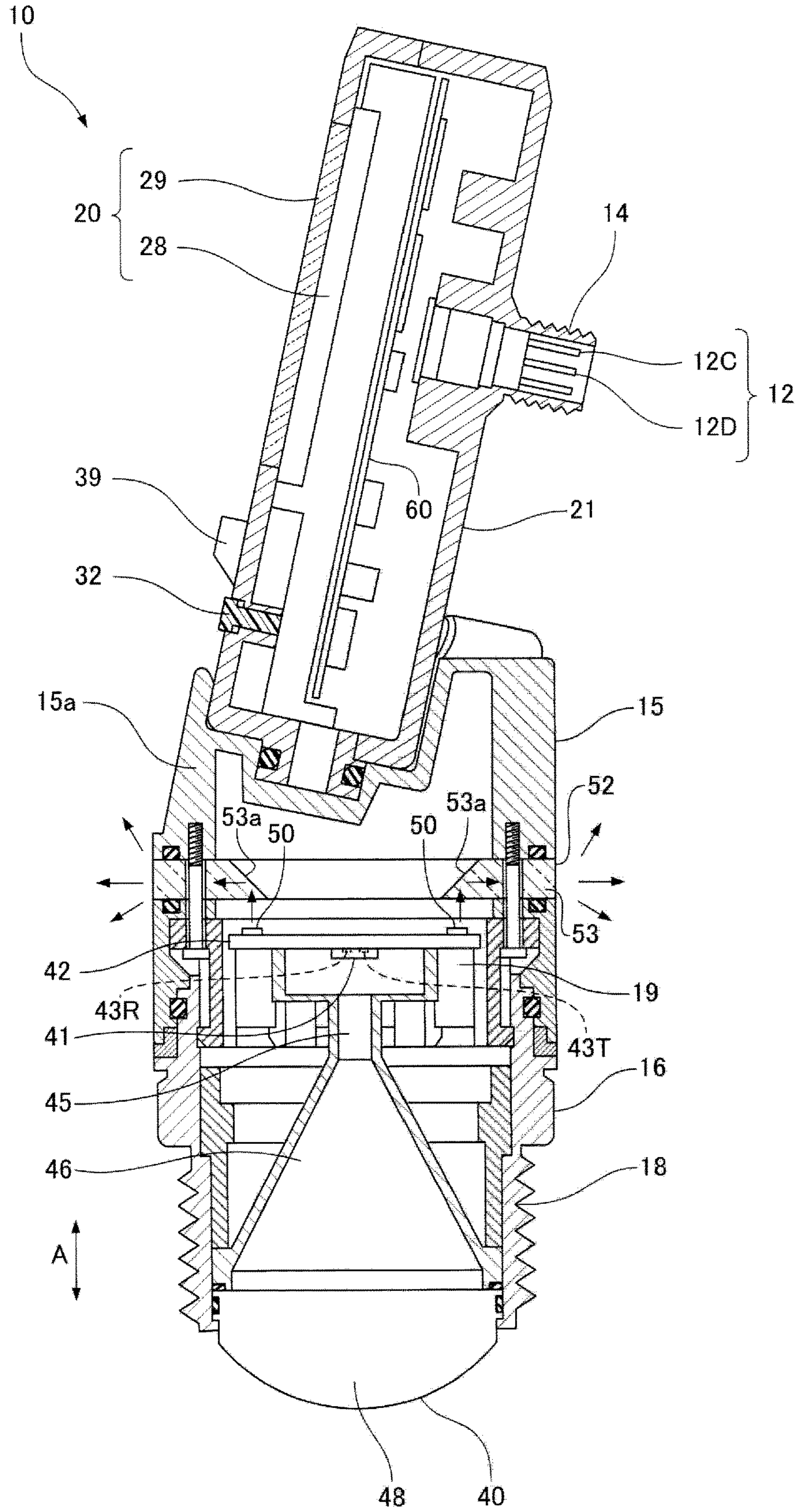
FIG. 13 is a cross-sectional view of the second example of the level meter.

Next, a second example (another example of the embodiment) of the level meter 10 will be described with reference to FIGS. 12 and 13. FIG. 12 is a perspective view illustrating the second example of the level meter 10. FIG. 13 is a cross-sectional view of the second example of the level meter 10. In FIGS. 12 and 13, components having the same functions as those of level meter 10 in FIGS. 1 and 2 are denoted by the same reference numerals as those in FIGS. 1 and 2, and the description thereof will not be repeated unless necessary.

In FIGS. 12 and 13, the housing 15 includes the base 15*a* and the terminal unit 21. The base 15*a* is disposed on one end side (lower side) in the longitudinal direction A of the housing 15. The terminal unit 21 is disposed on the other end side in the longitudinal direction A. In FIGS. 12 and 13, the display unit 20 is provided in the terminal unit 21. The terminal unit 21 can be separated from the base 15*a*. The base 15*a* has a cylindrical shape, while the terminal unit 21 has a prismatic shape.

As illustrated in FIGS. 12 and 13, the terminal unit 21 is provided with the separation operation knob 39. The user can separate the terminal unit 21 from the base 15*a* by operating the separation operation knob 39. For example, a claw portion (not illustrated) is provided on the terminal unit 21, and the terminal unit 21 is attached to the base 15*a* by the claw portion being caught on the base 15*a*. The separation operation knob 39 is interlocked with the claw portion, and when the user operates the separation operation knob 39, the claw portion is separated from the base 15*a*, and the terminal unit 21 can be separated from the base 15*a*. Note that base 15*a* and terminal unit 21 are connected by a cable for transmitting and receiving electrical signals, and even in a state where the terminal unit 21 is separated from the base 15*a*, the display unit 20 can display the bar graph 22 corresponding to the measured level Y. In this way, when the terminal unit 21 can be separated from the base 15*a*, the user can confirm the display of the display unit 20 at a position away from the base 15*a*. For example, in a case where the level meter 10 is disposed at a position higher than the viewpoint of the user, the user may have difficulty in confirming the display of the display unit 20. Here, when the terminal unit 21 can be separated from the base 15*a*, the user can easily confirm the display unit 20 at the site where the tank 70 is installed by pulling the terminal unit 21 to the height of his/her viewpoint.

In FIG. 13, since the display surface of the display unit 20 is inclined with respect to the longitudinal direction A, the bar graph 22 and the extending direction B of the gauge 24 are also inclined with respect to the longitudinal direction A. In FIG. 12, the angle between the longitudinal direction A and the extending direction B (the inclination angle of the display unit 20) is an acute angle. When the inclination angle of the display unit 20 is an acute angle, the vertical component of the extending direction B has a relatively large value. Therefore, also in FIG. 12, the bar graph 22 shows a larger value as it extends to a position away from the sensor unit 16 (the upper side in FIG. 12). Similarly, the gauge 24 also corresponds to a larger value at a position farther from the sensor unit 16.

In FIGS. 12 and 13, the connection portion 12 is disposed in a portion of the terminal unit 21 opposite to the display unit 20. Also in FIGS. 12 and 13, since the rotation mechanism 19 is provided inside the housing 15, the user can turn the connection portion 12 in a direction in which handling is easy by rotating the housing 15.

In FIGS. 12 and 13, the state lamp 52 is disposed on the base 15*a* in the housing 15. Specifically, the state lamp 52 in FIGS. 12 and 13 is provided on the outer peripheral surface on one end side (lower side) in the longitudinal direction A with respect to the display unit 20 and on the other end side (upper side) in the longitudinal direction A with respect to the sensor unit 16.

Furthermore, as illustrated in FIG. 13, the transmission unit 43T, the reception unit 43R, and the light source state LED 50 are provided on a common sensor board 42. Specifically, since the sensor IC 41 is disposed on the surface (lower surface) on one end side in the longitudinal direction A in the sensor board 42, the transmission unit 43T and the reception unit 43R included in the sensor IC 41 are disposed on the surface on one end side in the longitudinal direction A. The state LED 50 of the light source is disposed on a surface (upper surface) of the sensor board 42 on the other end side in the longitudinal direction A, that is, a surface opposite to the sensor IC 41. Since the state LED 50 is disposed on the same sensor board 42 as the sensor IC 41, the dimension in the length direction of the entire level meter 10 becomes small, and the level meter 10 becomes compact.

The transmission window 53 of the state lamp 52 is disposed on the outer peripheral surface above the state LED 50. The transmission window 53 disposed on the outer peripheral surface of the base 15*a* has a surface along the longitudinal direction A (a surface in the vertical direction) facing the outside of the housing 15. The light emitted from the state LED 50 is guided to the outside of the housing 15 through the transmission window 53 including a member that diffuses the light. Here, the member that diffuses the light included in the transmission window 53 may have a donut-shaped disk shape. In addition, it is preferable that a tapered surface 53*a* having a tapered shape is formed on the inner peripheral side surface of the donut shape of the member that diffuses light. When the tapered surface 53*a* is formed on the inner peripheral side of the transmission window 53, the light emitted from the state LED 50 is reflected by the tapered surface 53*a* and is reliably guided to the outside of the housing 15. Since the transmission window 53 faces the outside of the housing 15 with the surface along the longitudinal direction A, the light emitted from the transmission window 53 to the outside of the housing 15 is diffused in the direction intersecting the longitudinal direction A. Therefore, also in the level meter 10 of FIGS. 12 and 13, the light of the state lamp 52 can be visually recognized from the direction intersecting the longitudinal direction A, and the user can easily visually grasp the lighting state of the state lamp 52 from a long distance.

Figure 14:
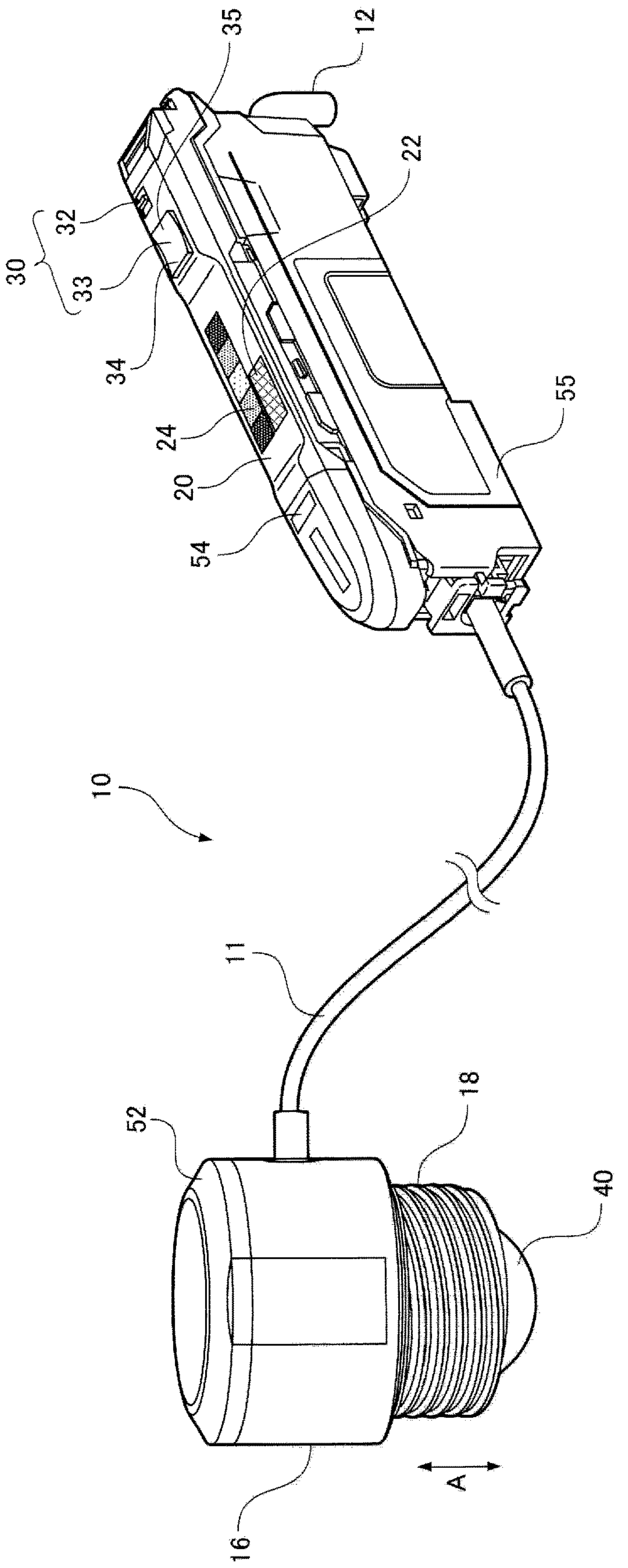
FIG. 14 is a perspective view illustrating a third example of the level meter.
Figure 15:
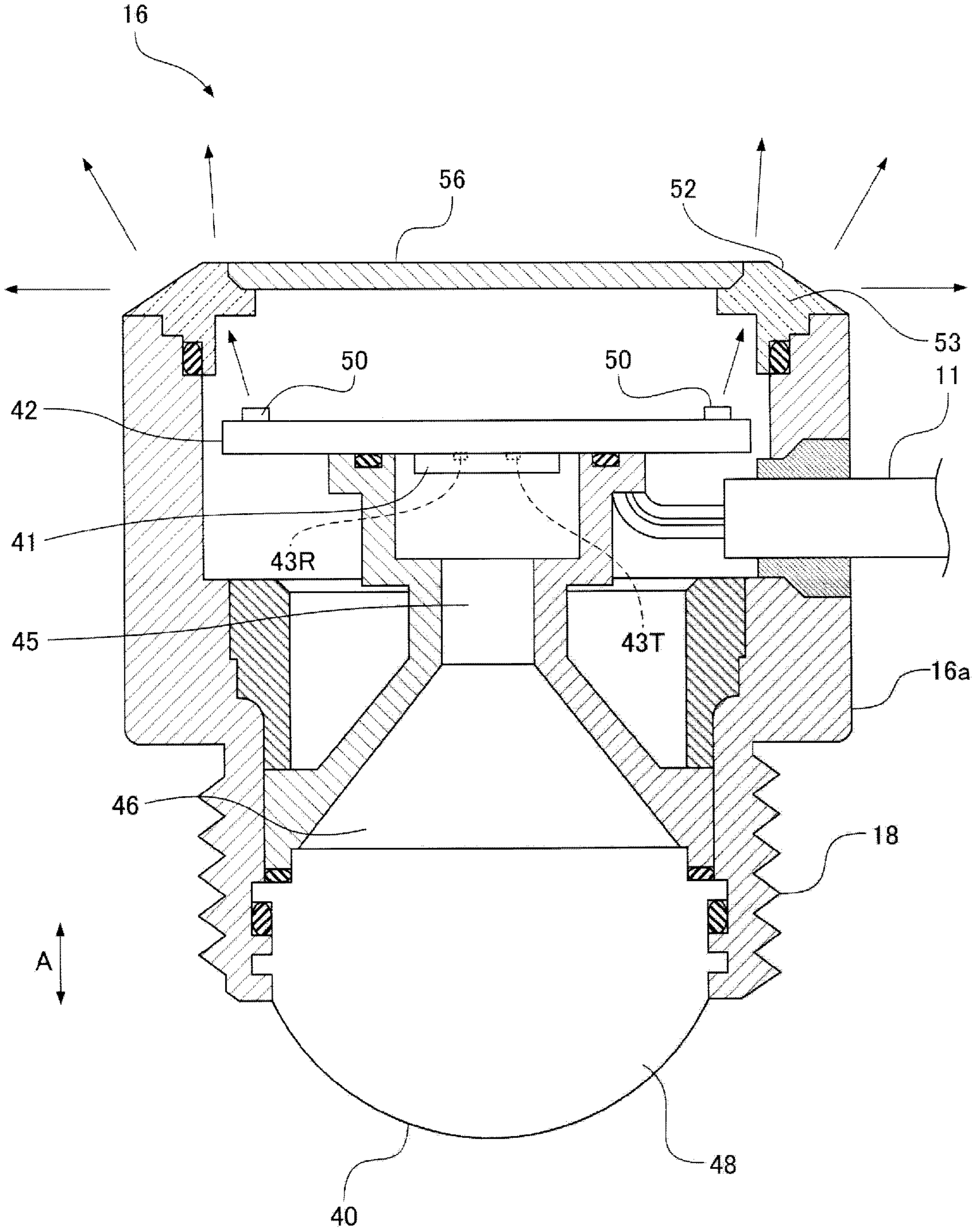
FIG. 15 is a cross-sectional view of a sensor unit of the third example of the level meter.
Figure 16:
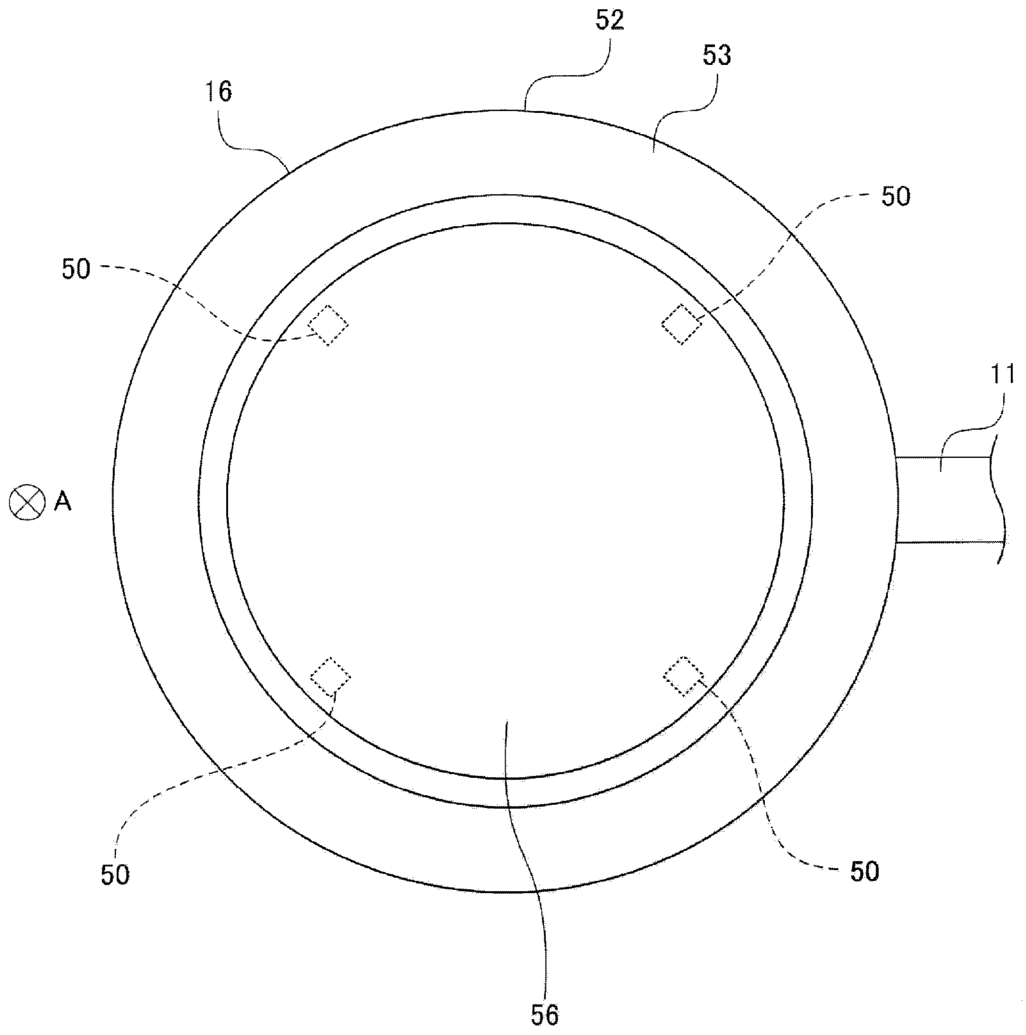
FIG. 16 is a plan view of a sensor unit of the third example of the level meter.

Next, a third example (another example of the embodiment) of the level meter 10 will be described with reference to FIGS. 14, 15, and 16. FIG. 14 is a perspective view illustrating the third example of the level meter 10. FIG. 15 is a cross-sectional view of the sensor unit 16 of the third example of the level meter 10. FIG. 16 is a plane of the sensor unit 16 of the third example of the level meter 10. In FIGS. 14, 15, and 16, components having the same functions as those of level meter 10 in FIGS. 1 and 2 are denoted by the same reference numerals as those in FIGS. 1 and 2, and the description thereof will not be repeated unless necessary.

In FIG. 14, the level meter 10 includes the sensor unit 16 and a remote controller 55 that can communicate with the sensor unit 16 at a position away from the sensor unit 16. The sensor unit 16 and the remote controller 55 are connected by a communication cable 11.

In the level meter 10 of FIG. 14, only the sensor unit 16 is attached to a container (such as the tank 70) that contains the measurement object 72, and the remote controller 55 communicates with the sensor unit 16 at a position away from the container.

As illustrated in FIG. 14, the sensor unit 16 has a generally cylindrical shape. Hereinafter, a direction along a cylindrical axis of the sensor unit 16 is referred to as a longitudinal direction A. In the sensor unit 16 of FIG. 14, one end in the longitudinal direction A is a measurement end unit 40. The sensor unit 16 measures the level of the object in a state where the measurement end unit 40 faces the object. Then, as illustrated in FIG. 15, a sensor IC 41 is provided inside a sensor housing 16*a* that covers the outer surface of the sensor unit 16. That is, the sensor unit 16 includes a transmission unit 43T that transmits a radio wave to be a transmission wave toward the object to one end side (lower side) in the longitudinal direction A, and a reception unit 43R that receives a reflected wave of the transmission wave reflected by the object.

An attachment screw portion 18 in which a thread is engraved on the surface of the cylinder is provided above the measurement end unit 40 in the sensor unit 16. The upper side of the attachment screw portion 18 has a cylindrical shape having a diameter larger than that of the attachment screw portion 18. The sensor unit 16 in FIG. 14 is fixed to the container with the measurement end unit 40 facing the object by screwing the attachment screw portion 18 to the upper surface of the container that contains the object. Then, the state lamp 52 whose lighting state changes according to the measured level is disposed on the other end side (upper side) in the longitudinal direction A in the sensor unit 16.

The remote controller 55 corresponds to the housing 15 in the level meter 10 of FIG. 1, and similarly to the housing 15 of FIG. 1, the remote controller 55 includes the display unit 20 that performs display according to the measured level. The display unit 20 can display the bar graph 22 and the gauge 24. Furthermore, the remote controller 55 includes the operation switch 30 for the user to operate the operation of the level meter 10. Furthermore, the remote controller 55 has the connection portion 12 serving as a connection terminal with an external device. The remote controller 55 also includes a remote state lamp 54. The remote state lamp 54 is lit in the same lighting state as the state lamp 52 of the sensor unit 16.

As illustrated in FIG. 15, inside the sensor housing 16*a*, the sensor IC 41 including the transmission unit 43T and the reception unit 43R is disposed on the lower surface of the sensor board 42. Then, the transmission wave transmitted downward from the transmission unit 43T of the sensor IC 41 is guided toward the object through the waveguide 45, the horn antenna 46, and the dielectric lens 48 in this order.

On the other hand, the state LED 50 serving as a light source of the state lamp 52 is disposed on the upper surface of the sensor board 42. A disc-shaped lid 56 and transmission window 53 are disposed above state LED 50. The axis of the disc-shaped lid 56 is parallel to the longitudinal direction A. As illustrated in FIGS. 15 and 16, the transmission window 53 including a member that diffuses light is disposed on the outer periphery of the lid 56 so as to surround the axis of the lid 56 parallel to the longitudinal direction A.

As illustrated in FIG. 16, four state LEDs 50 are arranged. The four state LEDs 50 are spaced apart from each other along a circumferential direction around an axis parallel to the longitudinal direction A (here, the axis of the lid 56). The circumferential intervals of the state LEDs 50 are preferably uniform so that the state lamps 52 emit light evenly in all directions.

As illustrated in FIG. 15, the state LED 50, which is a light source of the state lamp 52, is disposed near the upper end (the other end in the longitudinal direction A) inside the sensor unit 16. The transmission window 53 of the state lamp 52 is disposed above the state LED 50, specifically, on the outer periphery of the upper end of the sensor unit 16. The transmission window 53 has a tapered surface inclined with respect to the longitudinal direction A, and the light emitted from the state LED 50 is emitted from the tapered surface of the transmission window 53 to the outside of the housing 15. Further, the transmission window 53 includes a member that diffuses light. Therefore, the light emitted from the transmission window 53 is diffused in the direction intersecting the longitudinal direction A even when the state LED 50 is disposed in the direction parallel to the longitudinal direction A.

By diffusing the light emitted from the transmission window 53 in the direction intersecting the longitudinal direction A, the light of the state lamp 52 can be visually recognized from the direction intersecting the longitudinal direction A (for example, the horizontal direction orthogonal to the longitudinal direction A). Therefore, the user can easily visually grasp the lighting state of the state lamp 52 even at a position away from the sensor unit 16 attached to the container. In addition, the light of the state LED 50 is diffused by the transmission window 53 including a member that diffuses light, so that the light of the state LED 50, which is a point light source, is irradiated in all directions. Therefore, the user can easily visually grasp the state of the level of the object from any direction with respect to the sensor unit 16.

What is claimed is:

1. A level meter for measuring a level of an object, the level meter comprising:
- a transmission unit transmitting a radio wave to be a transmission wave toward the object to one end side in a longitudinal direction;
- a reception unit receiving a reflected wave of the transmission wave reflected by the object;
- a state lamp having a plurality of light sources; and
- a housing configured to house the transmission unit, the reception unit and the plurality of light sources, wherein
- a plurality of level ranges are set for the level,
- a lighting state of the state lamp changes according to the level range, the level range determined by the level measured based on the transmission wave and the reflected wave,
- the state lamp has a transmission window disposed around a periphery of the housing with respect to an axis parallel to the longitudinal direction, and
- the transmission window includes a diffusing member configured to diffuse light emitted from the light source in a direction intersecting the longitudinal direction.

2. The level meter according to claim 1, wherein the plurality of light sources of the state lamp are spaced apart from one another along a circumferential direction around an axis parallel to the longitudinal direction.

3. The level meter according to claim 1, wherein
- the transmission unit, the reception unit, and the light source of the state lamp are provided on a common sensor board,
- the transmission unit and the reception unit are disposed on a surface of the sensor board on one end side in the longitudinal direction, and
- the light source of the state lamp is disposed on a surface of the sensor board on another end side in the longitudinal direction.

4. The level meter according to claim 1, comprising:
- a sensor unit disposed on one end side in the longitudinal direction; and
- an upper housing disposed on another end side in the longitudinal direction, wherein
- the sensor unit, as part of the housing, includes the transmission unit and the reception unit,
- the upper housing includes a display unit configured to display according to the measured level, and
- the state lamp is disposed on another end side in the longitudinal direction of the display unit in the upper housing.

5. The level meter according to claim 1, comprising:
- a sensor unit disposed on one end side in the longitudinal direction; and
- an upper housing disposed on another end side in the longitudinal direction, wherein
- the sensor unit, as part of the housing, includes the transmission unit and the reception unit,
- the upper housing includes a base disposed on one end side in the longitudinal direction and a terminal unit disposed on another end side in the longitudinal direction,
- the terminal unit includes a display unit configures to display according to the measured level and is separable from the base portion, and the display unit is capable of displaying the measured level in a state where the terminal unit is separated from the base portion, and
- the state lamp is disposed on the base of the upper housing.

6. The level meter according to claim 1, comprising:
- a sensor unit including the transmission unit and the reception unit; and
- a remote controller communicable with the sensor unit at a position away from the sensor unit, wherein
- the remote controller includes a display unit configured to display according to the measured level, and
- the state lamp is disposed on another end side in the longitudinal direction in the sensor unit.

7. The level meter according to claim 1, comprising:
- a display unit configured to display according to the level measured based on the transmission wave and the reflected wave, wherein
- the display unit displays a bar graph and a gauge divided into a plurality of sections, length of the bar graph being expanding and contracting according to a value of the level,
- the level range corresponding to the level is indicated by a section of the gauge corresponding to a tip of the bar graph, and
- a lighting state of the state lamp changes depending on a position of the tip of the bar graph with respect to the section of the gauge.

8. The level meter according to claim 1, wherein a lighting state of the state lamp changes by switching at least two of a state in which the light source is not emitting light, a state in which the light source emits light in a first color, a state in which the light source emits light in a color different from the first color, a state in which the light source blinks in the first color, and a state in which the light source blinks in a color different from the first color.

9. The level meter according to claim 1, comprising:

a dielectric lens guiding the transmission wave toward the object.

10. The level meter according to claim 1, comprising:

a horn antenna guiding the transmission wave toward the object.

11. A level meter for measuring a level of an object, the level meter comprising:

a transmission unit transmitting a radio wave to be a transmission wave toward the object to one end side in a longitudinal direction;

a reception unit receiving a reflected wave of the transmission wave reflected by the object; and a state lamp having a plurality of light sources and has a transmission window configured to diffuse light emitted from the light sources, wherein a plurality of level ranges are set for the level, a lighting state of the state lamp changes according to the level range determined by the level measured based on the transmission wave and the reflected wave, the transmission unit, the reception unit, and the light source of the state lamp are provided on a common sensor board, the transmission unit and the reception unit are disposed on a surface of the sensor board on one end side in the longitudinal direction, and the light source of the state lamp is disposed on a surface of the sensor board on another end side in the longitudinal direction.

12. The level meter according to claim 11, comprising:

a sensor unit disposed on one end side in the longitudinal direction; and a housing disposed on another end side in the longitudinal direction, wherein the sensor unit includes the transmission unit and the reception unit, the housing includes a display unit configured to display according to the measured level, and the state lamp is disposed on another end side in the longitudinal direction of the display unit in the housing.

13. The level meter according to claim 11, comprising:

a sensor unit disposed on one end side in the longitudinal direction; and a housing disposed on another end side in the longitudinal direction, wherein the sensor unit includes the transmission unit and the reception unit, the housing includes a base disposed on one end side in the longitudinal direction and a terminal unit disposed on another end side in the longitudinal direction, the terminal unit includes a display unit configured to display according to the measured level and is separable from the base portion, and the display unit is capable of displaying the measured level in a state where the terminal unit is separated from the base portion, and the state lamp is disposed on the base of the housing.

14. The level meter according to claim 11, comprising:

a sensor unit including the transmission unit and the reception unit; and a remote controller communicable with the sensor unit at a position away from the sensor unit, wherein the remote controller includes a display unit configured to display according to the measured level, and the state lamp is disposed on another end side in the longitudinal direction in the sensor unit.

15. The level meter according to claim 11, comprising:

a display unit configured to display according to the level measured based on the transmission wave and the reflected wave, wherein the display unit displays a bar graph and a gauge divided into a plurality of sections, length of the bar graph being expanding and contracting according to a value of the level, the level range corresponding to the level is indicated by a section of the gauge corresponding to a tip of the bar graph, and a lighting state of the state lamp changes depending on a position of the tip of the bar graph with respect to the section of the gauge.

16. The level meter according to claim 11, wherein a lighting state of the state lamp changes by switching at least two of a state in which the light source is not emitting light, a state in which the light source emits light in a first color, a state in which the light source emits light in a color different from the first color, a state in which the light source blinks in the first color, and a state in which the light source blinks in a color different from the first color.

17. The level meter according to claim 11, comprising:

a dielectric lens guiding the transmission wave toward the object.

18. The level meter according to claim 11, comprising:

a horn antenna guiding the transmission wave toward the object.

* * * * *